(12) United States Patent
Palay et al.

(10) Patent No.: US 8,965,954 B2
(45) Date of Patent: Feb. 24, 2015

(54) ALWAYS READY CLIENT/SERVER DATA SYNCHRONIZATION

(75) Inventors: Andrew J. Palay, Mountain View, CA (US); Aaron Whyte, San Francisco, CA (US)

(73) Assignee: Google Inc., Mountain View, CA (US)

( * ) Notice: Subject to any disclaimer, the term of this patent is extended or adjusted under 35 U.S.C. 154(b) by 213 days.

(21) Appl. No.: 12/603,447

(22) Filed: Oct. 21, 2009

(65) Prior Publication Data

US 2010/0100590 A1    Apr. 22, 2010

Related U.S. Application Data

(60) Provisional application No. 61/107,312, filed on Oct. 21, 2008.

(51) Int. Cl.
| | |
|---|---|
| *G06F 15/16* | (2006.01) |
| *G06Q 10/10* | (2012.01) |
| *H04L 12/58* | (2006.01) |

(52) U.S. Cl.
CPC .......... *G06Q 10/107* (2013.01); *H04L 12/5895* (2013.01)
USPC ........................................................ 709/203

(58) Field of Classification Search
USPC ........................................................ 709/203
See application file for complete search history.

(56) References Cited

U.S. PATENT DOCUMENTS

| | | | |
|---|---|---|---|
| 6,560,655 B1 | 5/2003 | Grambihler et al. | |
| 7,627,595 B2 * | 12/2009 | Hao et al. .............................. | 1/1 |
| 7,747,566 B2 | 6/2010 | Tysowski et al. | |
| 7,860,825 B2 * | 12/2010 | Chatterjee et al. ............ | 707/610 |
| 7,860,827 B1 | 12/2010 | Ayyad | |
| 8,023,934 B2 * | 9/2011 | Jeide et al. ..................... | 455/418 |

(Continued)

FOREIGN PATENT DOCUMENTS

| | | |
|---|---|---|
| EP | 1014629 A2 | 6/2000 |
| JP | 2001-022627 | 1/2001 |

(Continued)

OTHER PUBLICATIONS

International Search Report and Written Opinion for PCT/US2009/061530 dated Apr. 6, 2010.
Leiba, B., "IMAP4 Implementation Recommendations," IBM T.J. Watson Research Center, dratf-leiba-imap-implement-guide-09.txt, IETF Standard-Working-Draft, Internet Engineering Task Force, IETF, Ch, No. 9, May 1, 1999, 1-22 pages.
Managing IMAP, "Anatomy of an IMAP Session," Chapter 3, downloaded on Oct. 30, 2010, 15 pages, http://proquest.safaribooksonline.com.

(Continued)

*Primary Examiner* — Ranodhi Serrao
*Assistant Examiner* — Thomas Richardson
(74) *Attorney, Agent, or Firm* — Morgan, Lewis & Bockius LLP

(57) ABSTRACT

Systems and methods for data synchronization are described. In some embodiments, a method is devised for a client to synchronize information with a server. This client receives a communication from a server to selectively synchronize information between the server and the client, the information includes data that have never been synchronized with the client and change operations that have not been synchronized in last data synchronization, wherein the data is arranged and received in an order from higher priority to lower priority. The client stores at least a portion of the data and at least a portion of the change operations in memory of the client in accordance to order received and enables a user of the client device to have immediate access to the portion of data and the portion of change operations in the communication that are stored on the client at any termination point of information synchronization.

35 Claims, 22 Drawing Sheets

(56) References Cited

U.S. PATENT DOCUMENTS

| | | | |
|---|---|---|---|
| 2001/0039629 A1 | 11/2001 | Feague | |
| 2002/0078075 A1* | 6/2002 | Colson et al. | 707/204 |
| 2004/0030739 A1* | 2/2004 | Yousefi'zadeh | 709/201 |
| 2005/0050142 A1 | 3/2005 | Capone et al. | |
| 2005/0147130 A1* | 7/2005 | Hurwitz et al. | 370/503 |
| 2006/0047819 A1* | 3/2006 | Caddes et al. | 709/227 |
| 2007/0203712 A1 | 8/2007 | Sunday et al. | |
| 2007/0203954 A1* | 8/2007 | Vargas et al. | 707/201 |
| 2007/0255854 A1 | 11/2007 | Khosravy et al. | |
| 2007/0283049 A1 | 12/2007 | Rakowski et al. | |
| 2008/0104133 A1 | 5/2008 | Chellappa et al. | |
| 2008/0168526 A1 | 7/2008 | Robbin et al. | |
| 2008/0242370 A1* | 10/2008 | Lando et al. | 455/574 |
| 2008/0307109 A1* | 12/2008 | Galloway et al. | 709/232 |
| 2009/0247134 A1* | 10/2009 | Jeide et al. | 455/414.2 |

FOREIGN PATENT DOCUMENTS

| | | |
|---|---|---|
| JP | 2002-014860 | 1/2002 |
| JP | 2005-242403 | 9/2005 |
| JP | 2007-115247 | 5/2007 |
| WO | WO 2007/100688 | 9/2007 |
| WO | WO 2008/095125 | 8/2008 |

OTHER PUBLICATIONS

Melnikov, A., "Synchronization Operations for Disconnected IMAP4 Clients,"draft-melnikov-imap-disc-02.txt, IETF Standard-Working-Draft, Internet Engineering Task Force, IEFT, CH No. 2, Oct. 1, 2002, 1-20 pages.

International Search Report and Written Opinion for Related Application No. PCT US2009/061540, Date of Mailing Jan. 25, 2010, 11 pages.

Google Inc., Communication pursuant to Article 94(3) EPC, 09744847.6, Oct. 16, 2013, 6 pgs.

Google Inc., Communication pursuant to Article 94(3) EPC, EP 09744845.0, Jan. 22, 2014, 6 pgs.

Google Inc., Notice of Reasons for Rejection, JP 2011-533306, Jan. 30, 2014, 3 pgs.

Google Inc., Notice of Reasons for Rejection, JP 2011-533308, Jan. 30, 2014, 3 pgs.

Liu, Continual Queries for Internet Scale Event-Driven Information Delivery, IEEE Transactions on Knowledge and Data Engineering, vol. 11, No. 4, Jul./Aug. 1999, pp. 610-628.

* cited by examiner

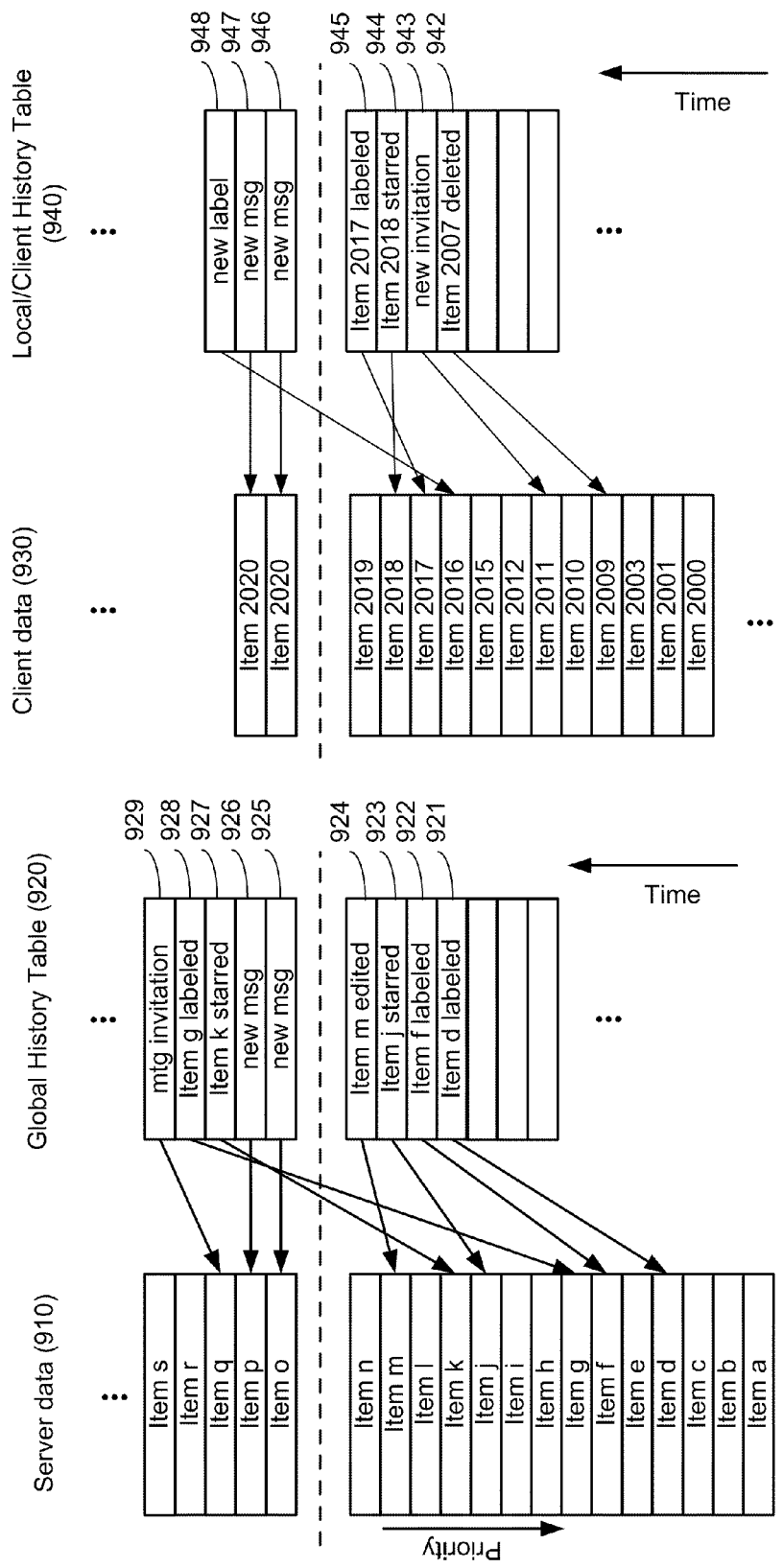

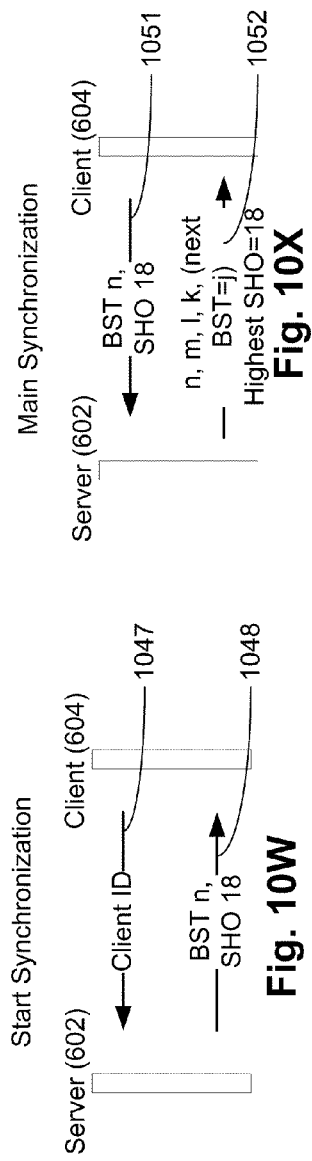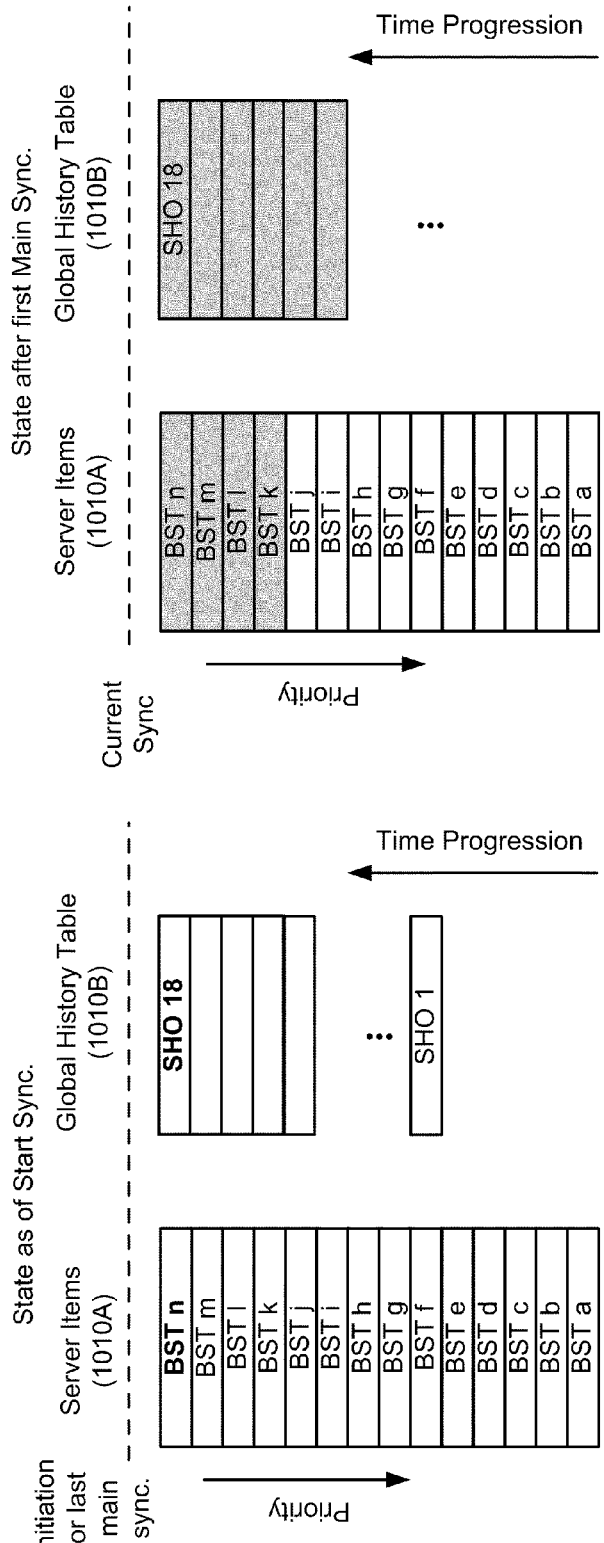
Fig. 10X
Fig. 10B
Fig. 10W
Fig. 10A

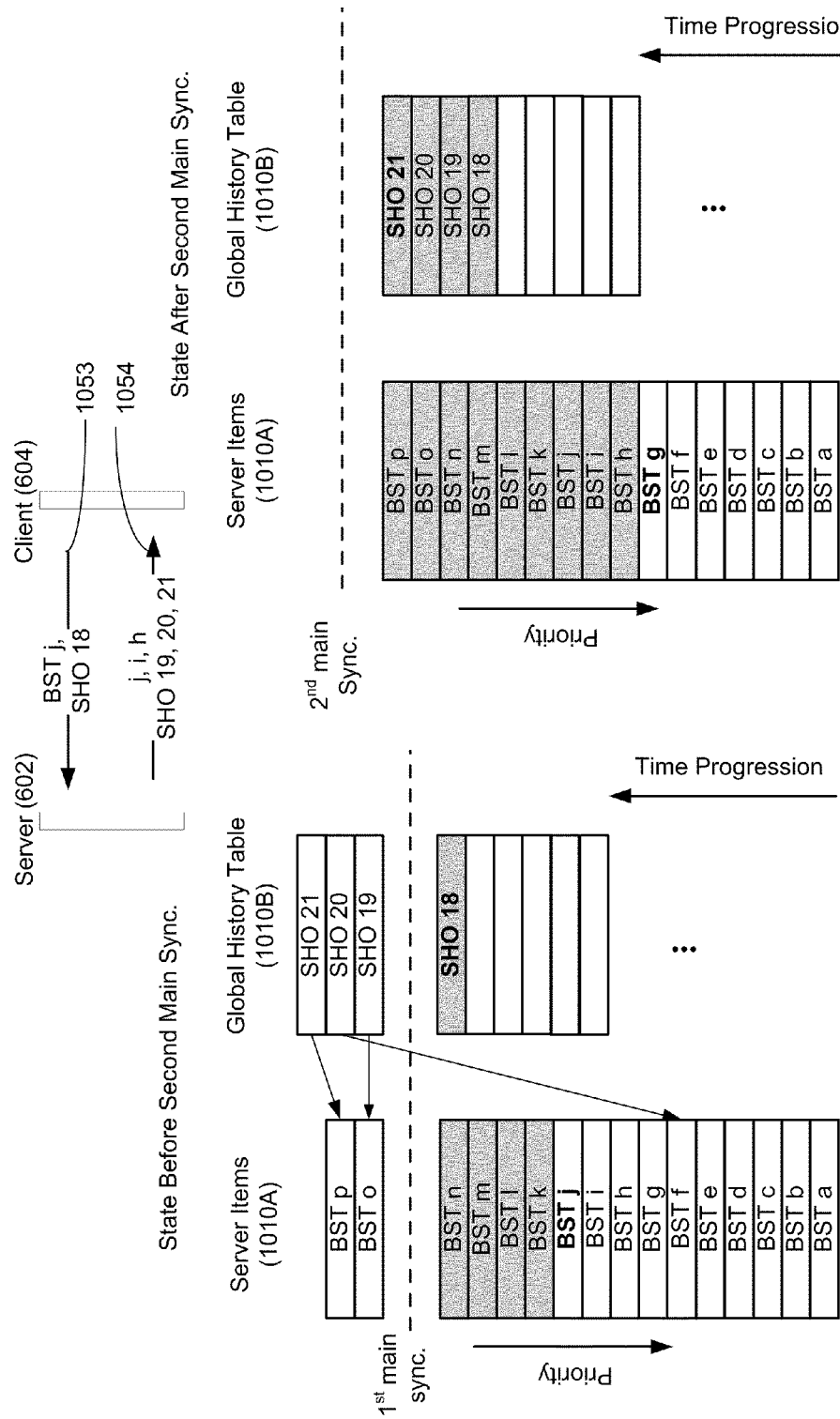

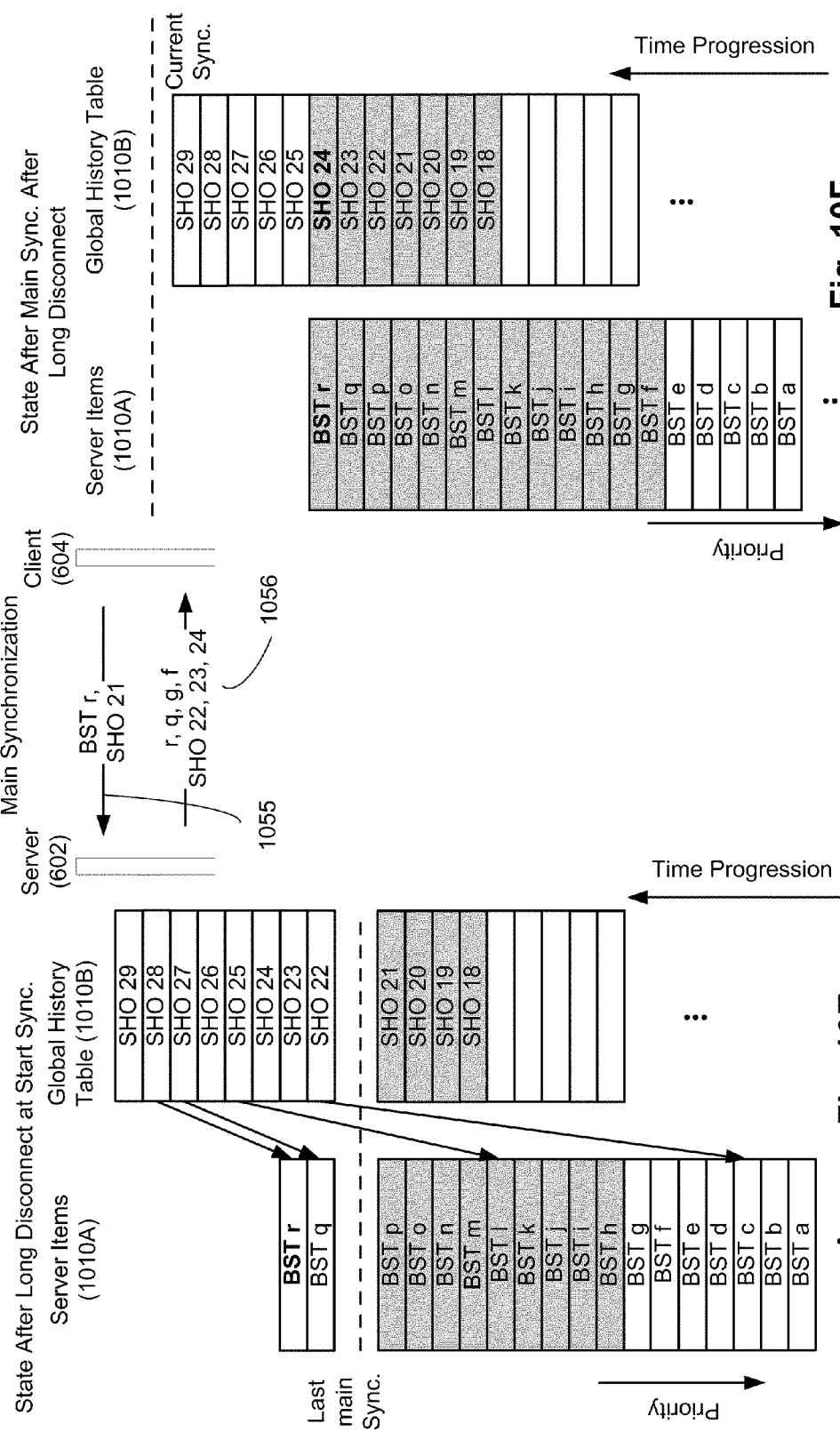

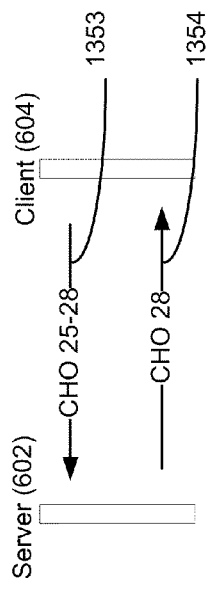
Fig. 13Y  Main Synchronization
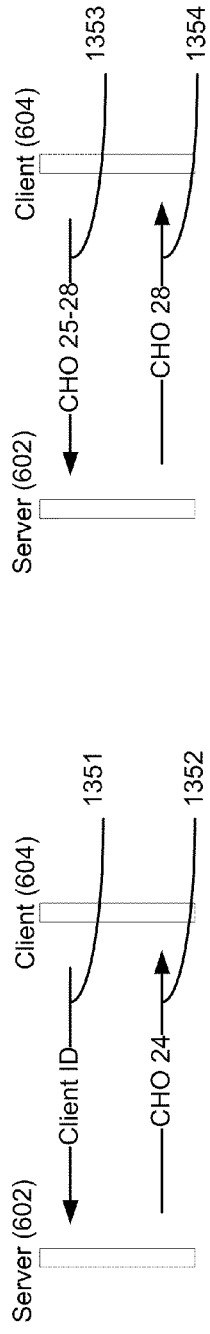
Fig. 13B
Fig. 13X  Start Synchronization
Fig. 13A

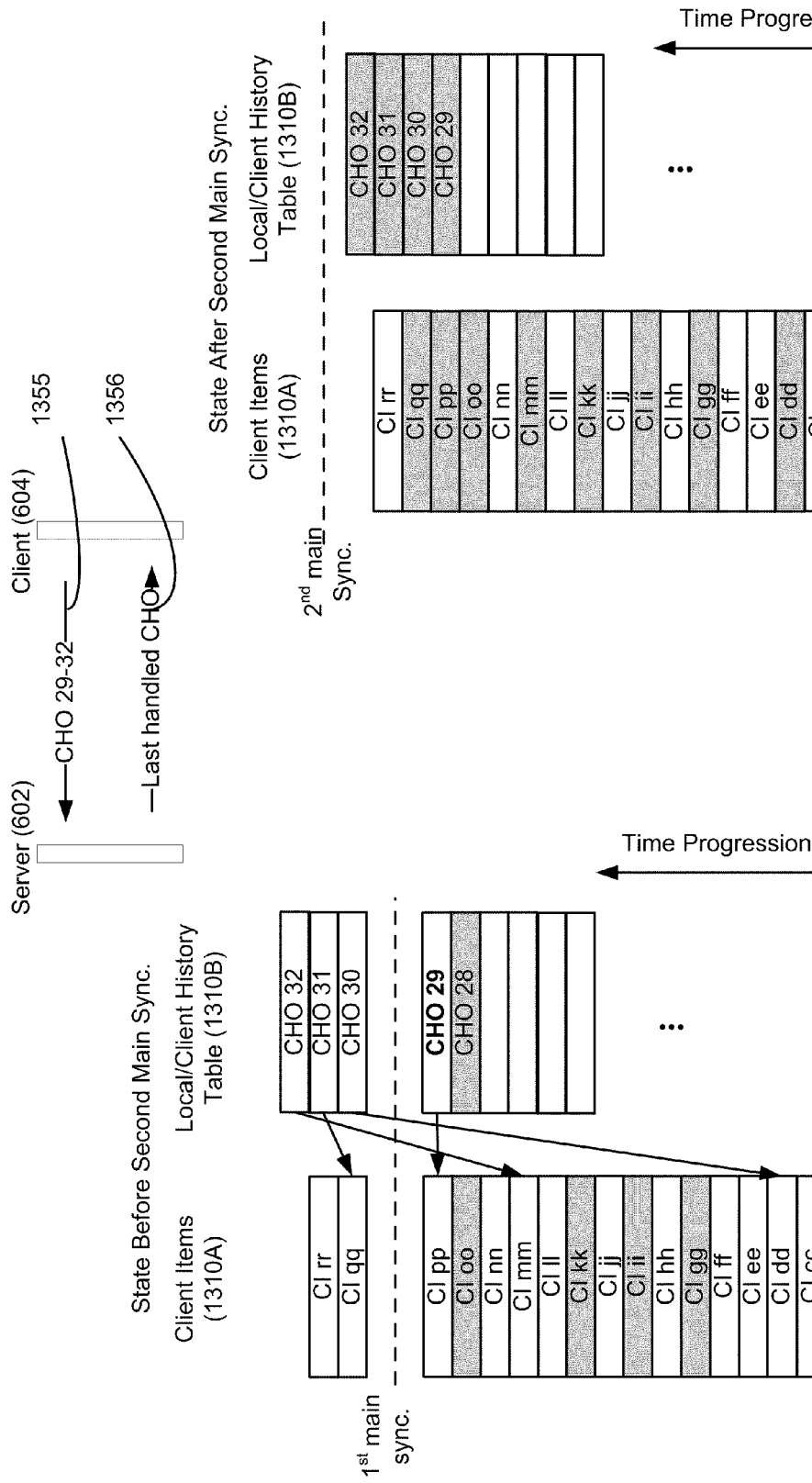

ALWAYS READY CLIENT/SERVER DATA SYNCHRONIZATION

RELATED APPLICATIONS

This application claims priority to U.S. Provisional Patent Application No. 61/107,312, filed Oct. 21, 2008, entitled "Always Ready Client/Server Data Synchronization," the content of which is incorporated by reference herein in its entirety.

This application is related to U.S. Provisional Patent Application No. 61/107,276, titled "A Search Based Specification for Data Synchronization" filed on Oct. 21, 2008, which is incorporated by reference in its entirety.

This application is related to U.S. patent application Ser. No. 12/603,453, titled "Search Based Specification for Data Synchronization" by A. J. Palay and A. Whyte, filed on Oct. 21, 2009, which is hereby incorporated by reference in its entirety.

TECHNICAL FIELD

The disclosed embodiments generally related to the field of client-server interaction, in particular, the synchronization of items between a client device and a server.

BACKGROUND

Many software applications (e.g., e-mail) are designed to operate on both a client device and a server system, or on a client device with support from a server system. These applications enable a user to freely create, receive, transmit, and modify data regardless of whether the user is operating on the client device or on the server. Synchronization of data between the client and the server allows consistency to be maintained between the application data residing on the client and the server. Synchronization is important as, for reasons of efficiency, a client device generally operates mainly with locally-stored data. For example, in the case of a client-server email application where an e-mail client executes on a portable device (such as a laptop or a mobile telephone) in communication with a separate email server, synchronization of email application data requires that email messages received at the email server are downloaded to the email client (this is called downhill synchronization) and operations performed on the locally-stored email data by the client are subsequently uploaded to the email server (this is called uphill synchronization).

Data synchronization can operate between a client and server more or less continuously as long as the server and the client remain in communication. However, synchronization becomes more challenging when the server and client have been out of communication for while, either due to a communications outage or the need for the client to operate in an offline or "airplane" mode, or when the client device is being newly configured to connect to the server, in which case the client device has little or no local application data stored in its memory. In such a situation, a large amount of data received at the server during a communication outage will not have been synchronized to the client when the client reconnects to the server, nor will offline client operations have been synchronized to the server. The subsequent synchronization step, where a large amount of application data needs to be downloaded to the client, is sometimes referred to as "priming the cache" of the client device.

Prior approaches to priming the cache of a client device are inconvenient and/or slow. This is especially the case in those prior implementations that require priming to be completed before the client is able to start operating with the downloaded application data. Priming the cache in this way can be a long process that requires a user to wait for a substantial time prior to being able to use the locally-stored data.

For example, in one prior implementation for priming the cache of a client device with email application data, a substantial portion of the email data stored at the server is first written onto one or more CDs, then a user physically copies the data from the CDs onto a client device (such as a laptop). In other implementations, the set of data to be synchronized to a client is downloaded via a network connection, which means that a communication outage could interrupt a lengthy downhill synchronization operation, rendering the client device unable to use any of the downloaded data.

In other implementations of downhill synchronization, the data to be synchronized to a client is downloaded from the server chronologically, from oldest to newest data, which means that, should the client go offline prior to completion of synchronization (and was able to use the incomplete data), only the oldest data would be available on the client device, which would be frustrating to the user—especially in the case where the user no longer is able to connect to the server.

Since client devices generally have less memory available to store application data than servers, a more desirable method of synchronization of data from the server (which is often a subset of all data stored on the server) to the client is preferred so that a user of the client can have immediate access to the most relevant data after each synchronization.

SUMMARY OF EMBODIMENTS

In some embodiments, a method for a server to synchronize information with a client includes, at a server, identifying, based on a record of past synchronizations maintained on the server, at least one of data that have never been synchronized with the client and change operations that have not been synchronized in last synchronization; sending a communication to selectively synchronize information between the server and the client, wherein the information includes the identified data and the identified change operations, wherein the data is arranged and transmitted in an order from higher priority to lower priority; and updating the record to include portions of the data and change operations in the communication that have been successfully synchronized with the client at any termination point of information synchronization.

In other embodiments, the server method further includes receiving a request from the client to initiate data synchronization with the server.

In other embodiments, the server method further include change operations that are arranged in chronological order according to when the change operations occurred on the server and old changes are transmitted before new changes.

In some embodiments, a client method to synchronize information with a server includes, at a client device, sending a request to inform the server a next range of data and change operations to begin next synchronization; in response to the request, receiving a communication from the server to selectively synchronize information from the server to the client that includes: in a first synchronization mechanism, a first data set including data on the server that have not been previously synchronized with the client, wherein the first data set is to be received in an order from high priority to low priority, and in a second synchronization mechanism, a second data including change operations that have not be synchronized in a last synchronization with the client, wherein the second data set is arranged in a chronological order based on occurrence of each change operation on the server, with old change operations to be received before new change operations; storing at least a portion of the information in memory of the client; and enabling a user of the client device to access and use at least the portion of the information that have been successfully stored in memory at any termination point of information synchronization.

In some embodiments, this client method includes having the order of priority arranged in accordance with relevance of data with respect to user of the client such as recency of data, so that more relevant data is given a higher priority and transmitted to the client before than less relevant data of lower priority.

In some embodiments of this client method, the first data synchronization mechanism and the second data synchronization mechanism are independent of each other but occur concurrently so that synchronization of the first data set and the second data set are synchronized simultaneously.

Still in other embodiments, this client method includes maintaining a record on the client of a last data range successfully synchronized with the server for inclusion in a next request for synchronization to be sent to the server to identify a next data range on the server for synchronization with the client.

BRIEF DESCRIPTION OF THE DRAWINGS

For a better understand of the nature and embodiments of the invention, reference should be made to the Description of Embodiments below, in conjunction with the following drawings in which like reference numbers refer to corresponding parts throughout the figures.

FIG. 9A is a diagram illustrating the relationship between server items and the global history table on the server in accordance with some embodiments of the present invention.

FIG. 9B is a diagram illustrating the relationship between client items and the local/client history table on the client in accordance with some embodiments of the present invention.

FIGS. 10A-10B, 10W and 10X are diagrams illustrating the concept of start synchronization leading to a main synchronization in accordance with some embodiments of the present invention.

FIG. 10C-10D, 10Y are diagrams illustrating the concept of main synchronization under general operation condition in accordance with some embodiments of the present invention.

FIG. 10E-10F, 10Z are diagrams illustrating the concept of main synchronization after a long period of disconnect in accordance with some embodiments of the present invention.

FIGS. 13A-D and 13X-Z are diagrams illustrating the concept of uphill synchronization between the client and the server in accordance to some embodiments of the present invention.

DESCRIPTION OF EMBODIMENTS

The present invention is directed to a client-server system and corresponding methods and systems of synchronization of items between a client and a server. The following disclosure describes methods and systems of synchronization that allow priming of the client cache and data exchange between the client and the server to occur in parallel to overcome the need for complete priming of local cache before synchronized data is accessible. The methods and systems described are applicable to any client-server applications that involve data synchronization.

Figure 1:
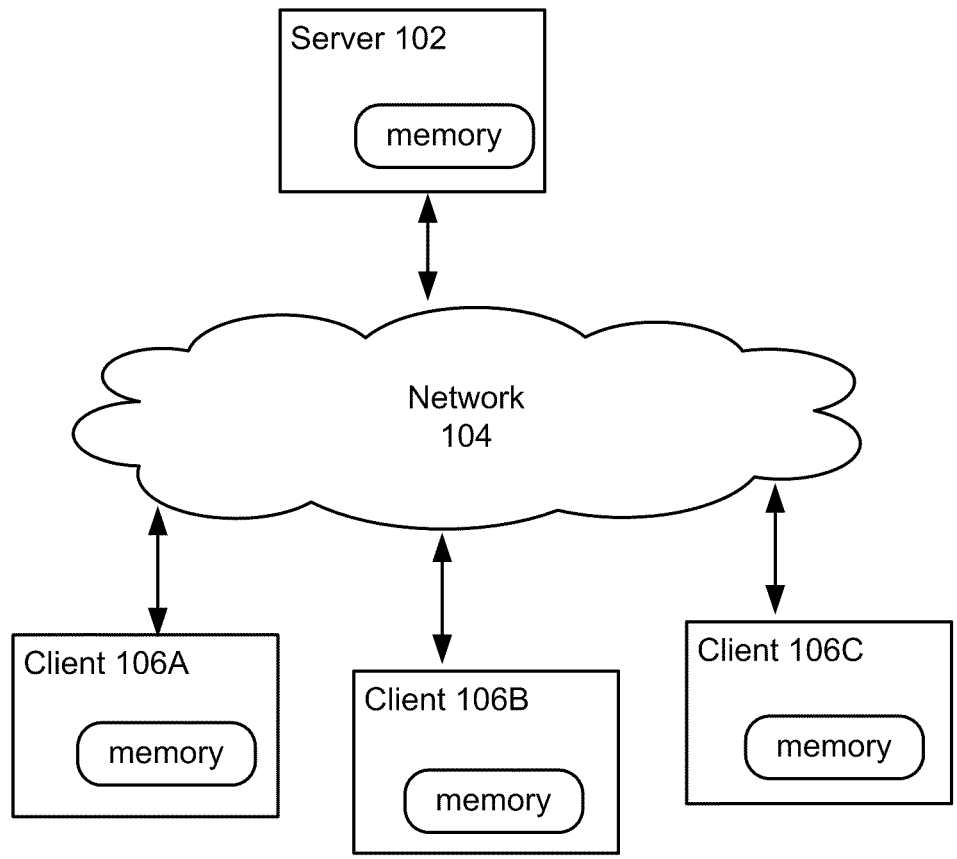
FIG. 1 is a diagram illustrating a client-server based network system in accordance with some embodiments of the present invention.

FIG. 1 schematically illustrates an exemplary client-server based network system. The client-server based network system includes a server 102, a network 104 for communication, and a plurality of client devices 106A-C. It should be understood that a common implementation of this system has at least one server, at least one communication network, and a plurality of client devices. In a different configuration, the system may include a plurality of servers, a plurality of networks and a plurality of client devices.

In some embodiments, the network 104 connecting the server 102 and the clients 106 may be a private or public network and can be wired or wireless to enable communications between the server 104 and the clients 106 such that data exchange is possible. In some embodiments, the network may be the Internet; in others, a communication network may be private or has security to limit access to a group of users. In the latter, the network may be a LAN. Other embodiments of the network 104 may also include a WiFi network and/or a WiMax network. Another embodiment of the network 104 may be a cellular network that enables transmission and reception of data by mobile devices such as cellular telephones and smart phones. Such cellular network may be considered private where only paid subscribers have access thereto.

The client devices 106 may take on various forms. In some embodiments, a client device may be a local computer communicating to a computer server. In other embodiments, a client device may be any one of a personal digital assistant (PDA), a smart phone, or a cellular phone. The client device may operate a software application that can also be operated on a server, or, it may operate an application front end that cooperates with an application back end that operates on the server. The server 102 is capable of performing operations related to the management, data storage requirements, organization and/or execution of an application. For the purpose of this disclosure, both the client 106 and the server 102 include memory in which application data to be synchronized can be stored. More detailed descriptions of the server and the client are discussed below in FIGS. 2 and 3 respectively.

Figure 2:
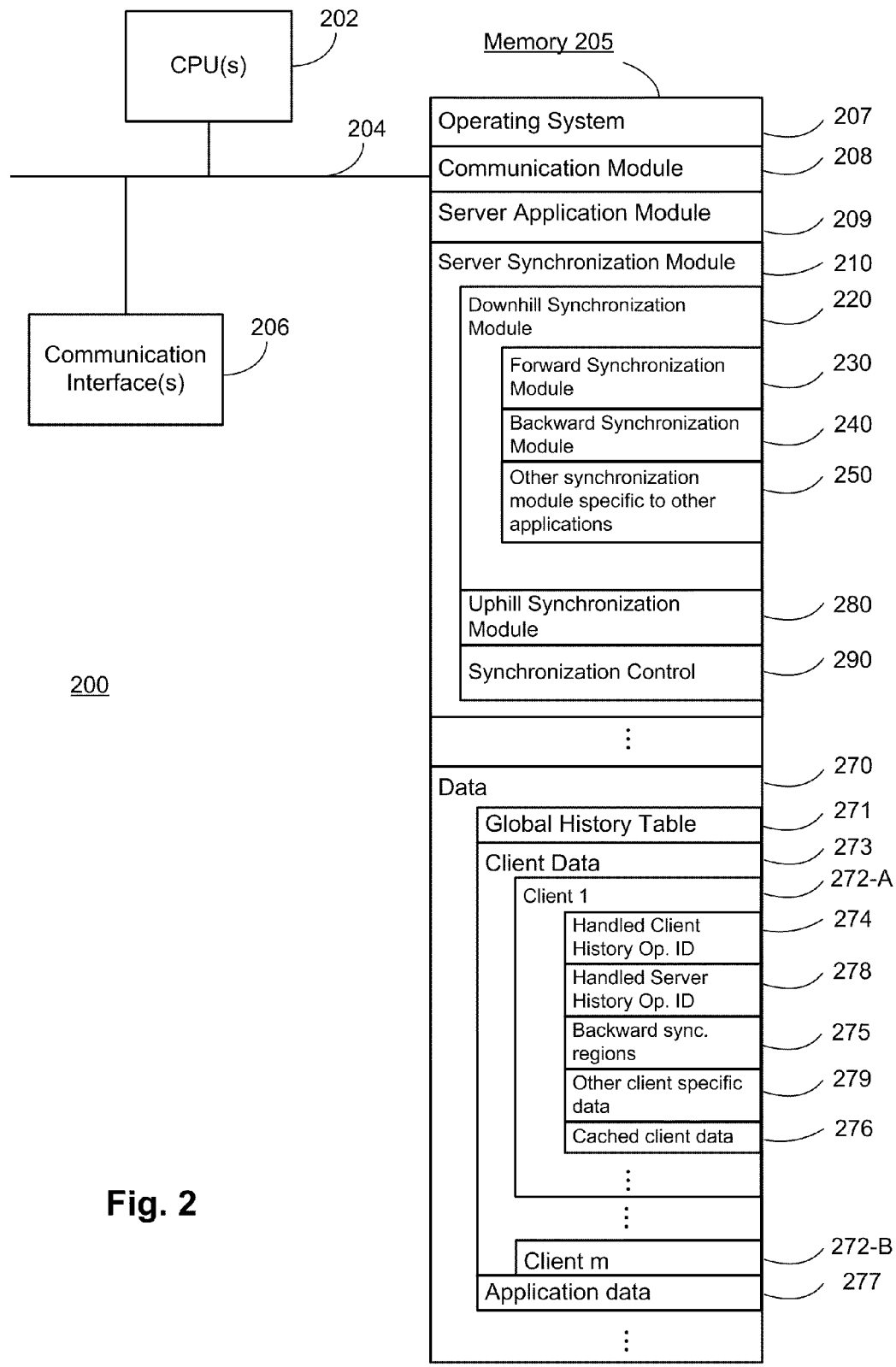
FIG. 2 is a block diagram of an exemplary server in the client-server based network system in accordance with some embodiments of the present invention.

FIG. 2 is a block diagram of an exemplary server in the client-server based network system described with reference to FIG. 1. The server 200 typically includes one or more processing units (CPU's) 202, one or more network or other communication interfaces 206, memory 205, and one or more communication buses 204 for interconnecting these components. Memory 205 includes high-speed random access memory, such as DRAM, SRAM, DDR RAM or other random access solid state memory devices; and non-volatile memory, such as magnetic disk storage devices, optical disk storage devices, flash memory devices, or other non-volatile solid state storage devices. Memory 205 may optionally include one or more storage devices remotely located from the CPU(s) 202.

In some embodiments, memory 205 stores programs, modules and data structures, or a subset thereof that includes: an operating system 207, a communication module 208, server application module 209, server synchronization module 210, and data structures 270. Note that the illustrated organization of these components is exemplary and does not preclude any alternative arrangement or organization of the functionality attributed to the components. Other embodiments may combine the functions attributed to these components in any combination, including a subset or superset of these components. This is true of any and all software components described herein with reference to any server or client device.

The operating system 207 includes procedures for handling various basic system services and for performing hardware dependent tasks.

The communication module 208 is used for interfacing server applications 209 to other server or client devices. Interfacing using the communication module 208 is accomplished via the one or more communication network interfaces 206 (wired or wireless) and one or more communication networks, such as the Internet, other wide area networks, local area networks, metropolitan area networks, and so on.

The application module 209 includes different client-driven or server-driven applications. If an application is a client-driven application, when the application is active on the server, the application itself is driven by commands originating from a corresponding application in the client device. If an application is a server-driven application, when the application is active on the server, the application on the server drives a corresponding application on the client device. In some embodiments, applications may be equally driven by the client and the server, configured and adapted for operation in client devices such as a cellular telephone, and may include a server synchronization module 210.

The server synchronization module 210 is used for synchronization of data that may be utilized by one or more applications that operate on a client and a server or that operate cooperatively between a client and server (as is the case for email client and server applications). The synchronization module 210 may include synchronization configurations that are specific to a single application or are generalizable to more than one application. In one embodiment, the synchronization module 210 includes a downhill synchronization module 220, an uphill synchronization module 280, and a synchronization control 290. The functions of these modules correspond to their counterparts on the client, which are described with reference to FIG. 3.

The synchronization control 290 is a software module that controls the operations of data synchronization in accordance with connectivity to a communications network, detection of unsynchronized data, or other conditions present when data synchronization takes place. In one embodiment, the server is configured to initiate synchronization by responding to a synchronization request from the client, although the reverse may also be possible.

The downhill synchronization module 220 is responsible for synchronizing data and data changes that have occurred on the server, from the server to the client. In other words, this module is responsible for priming the client cache and for ensuring that data changes on the server are reflected in the data residing on the client. In one embodiment, downhill synchronization is implemented by forward synchronization and backward synchronization modules, and any other synchronization modules that are specific to other applications.

In some embodiments, the forward synchronization module 230 monitors data changes on the server as these changes occur chronologically and reports them to the client in chronological order. That is, the forward synchronization module downloads data updates to the client device in a forward chronological order—from older to newer updates.

In some embodiments, the backward synchronization module 240 downloads existing data items to the client in order of priority or a degree of relevance to the user. In some embodiments, priority may be defined as physical organization of data based on one or more criteria and relevance may be defined as the user's level of interest in the data to be synchronized. Therefore, priority may be established based on criteria defining relevance or interest level of the data to the user. For instance, priority or relevance of a particular data update may be determined as a function of the type of data being synchronized, time in which data changes occurred, and other elements associated with data or data changes that may characterize the user's interest in the data or data changes. It is an advantage of the present invention that in some embodiments higher priority data items are downloaded to a client before lower priority items, and clients are able to operate in an offline mode with partially synchronized data. In contrast to the prior art, this ensures that, should a backward synchronization operation be interrupted prior to its completion (e.g., if there is a communication outage, or the user takes the client device offline), the user will still be able to use the client device in an offline mode with the highest priority local data for one or more applications. In some embodiments, when communications are re-established between client and server, backward synchronization continues where it left off, with the server downloading progressively lower priority/relevance data until backward synchronization is complete.

In some embodiments, data priority for a backward synchronization operation is determined by the relative age of an operation or piece of data stored on the server—with younger items having a higher priority for updating. For example, in the context of an email application, a user of a portable device with an email client might prefer to have available for offline use of the device his most recent email messages received at the server. In this example, the newest messages would have the highest priority to ensure that they are synchronized first to the client device. In other embodiments, the highest priority might be assigned to email data associated with a particular sender (such as a manager or spouse) or with a particular subject line (such as a warning). In this way, embodiments of the present invention enable users of portable electronic devices to have available for offline use whatever server data is most relevant, or of highest priority, to their interests. This priority concept is applicable to data for applications other than email, including but not limited to, digital media files, such as photos, calendar or contact information, or application data, such as documents or spreadsheets.

Therefore, in some embodiments, data changes that occur on the server are synchronized with the client device both chronologically (in the case of forward synchronization) and in order of priority/relevance (for backward synchronization). Other synchronization modules 250 may also exist specifically for other applications which may include configurations customized for data in these applications.

The same mechanism of data synchronization using forward synchronization and backward synchronization may be useful for other types of data, including but not limited to images, email conversations containing distinct and separate email messages, contact information, and calendar information etc. In some embodiments, relevance or priority may be established based on one or more criteria which, but are not limited to, time of editing, who is editing the data or images, when a message arrive, and who posted a message.

The uphill synchronization module 280 is responsible for the synchronizing of data changes that have occurred on a client to the server. On the server, this uphill synchronization module 280 interacts with the client's uphill synchronization module (described with reference to FIG. 3) to obtain data changes that have occurred on the client and to ensure that they are reflected in the data on the server.

The data module 270 includes data files that are used by the applications in the server application module 209 as well as data used for synchronization with client devices. In some embodiments the data modules 270 may include at least one of a global history table 271, client data 273 which contains client specific data, and application data 277.

The global history table 271 contains information about data changes on the server. Specifically, information in the global history table may be used for forward synchronization with the client. In some embodiments, the information in the global history table is stored chronologically.

The client data 273 includes data specific to each client that interacts with the server; for example, individual clients include client 1 272-A through client 'm' 272-B. Specific data stored for each client includes the last handled server history operation identification (server history op. ID) 278, the backward synchronization regions 275, and the last client history operation ID (client history op. ID) acknowledged by the server 274. The cached client data 276 may include data and changes to data on the server that are associated with the particular client while the other client-specific data 279 contains other data (e.g., the sync. configuration) that is used for synchronization.

Each data item on the server has a unique identification or backward synchronization token (BST) so that the data can be identified and prioritized by the synchronization mechanism for backward synchronization. Unique identification ensures that the correct data is synchronized. It is important to appreciate that BST are well ordered so that priority of data items may be established for backward synchronization. In some embodiments, the unique identification may be defined by the time stamp in which the particular data item (e.g., mail message) was created or received, so that all data items can be ordered by time. Still in other embodiments, the BST for each data item may have at least one time stamp element along with other parameters that are also used for determining priority or relevance. For instance, some embodiments may prioritize based on date and size, where date is used as a primary criterion and size as a secondary parameter. In some embodiments, algorithms for weighing and combining multiple parameters including time stamp and other information such as labels, size, sender etc., may be used for determining the ordering of data for backward synchronization.

The backward synchronization regions 275 indicate the regions of data that have been synchronized with the client during backward synchronization. Each backward synchronization region contains two backward synchronization tokens (BST). Together, these two BSTs indicate a starting point and ending point of the range of data on the server that has been synchronized with the client. Therefore, one BST will represent the first data item in the range that was synchronized and the second BST will represent the last data item in the range that was synchronized. Data in the backward synchronization regions will be skipped in subsequent backward synchronizations.

The last handled server history operation (SHO) ID 278 is the last SHO ID that is synchronized with the client in forward synchronization. The last handled SHO ID represents the data change that was last synchronized with the client. This allows the server determine which data changes in the global history table 271 have been synchronized with the client and no longer need to be maintained in the Global History Table and thus can be removed. Therefore the last handled SHO ID 278 is used for organizing and managing the size of the global history table in forward synchronization.

The last client history operation (CHO) ID acknowledged by the server 274 represents the last CHO ID on the client that was synchronized with the server. This CHO ID represents the last data change on the client that was synchronized with the server in the last forward synchronization. This also serves as the starting point for the next forward synchronization when the server next connects with the client. Similar to SHO IDs, CHO IDs are unique and specifically associated with the client. For instance, they may be represented by a time stamp associated with the creation, sending, or modification of an email on the client.

Figure 3:
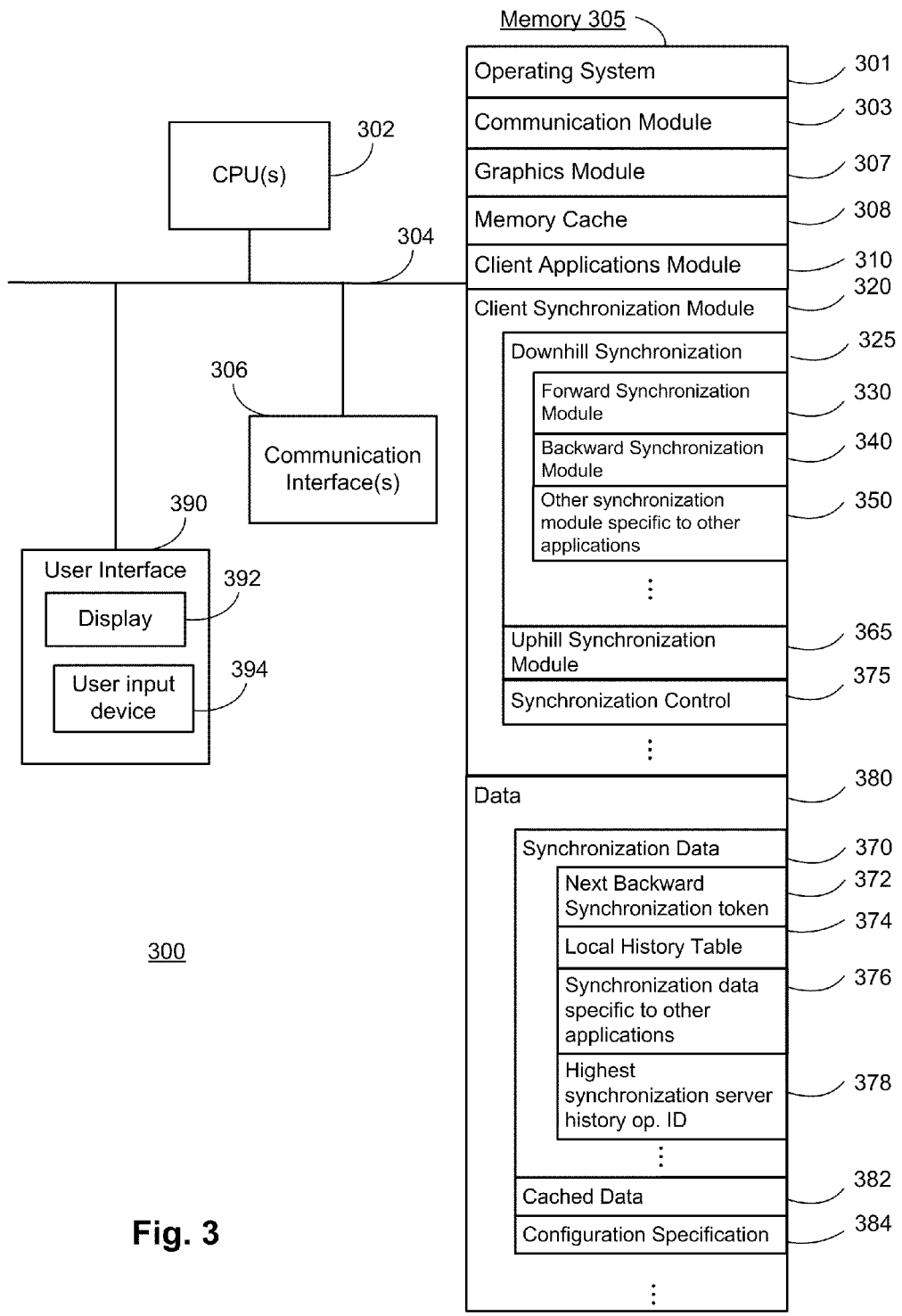
FIG. 3 is a block diagram of an exemplary client that interacts with the server in accordance with some embodiments of the present invention.

FIG. 3 is a block diagram of an exemplary client 300 that interacts with a server. The client 300 generally includes one or more processing units (CPU's) 302, one or more network or other communications interfaces 306, memory 305, and one or more communication buses 304 for interconnecting these components. The communication buses 304 may include circuitry (sometimes called a chipset) that interconnects and controls communications between system components.

The client device 300 may include a user interface 390 having an output device, like a display 392 and a user input device 394. The display 392 may be an active matrix display or a touch screen display, etc., and the user input device 394 may include any combination of, for example, a numeric entry key pad, soft keys, touch pad, alphanumeric entry key pad or a touch screen etc. The Memory 305 may include high speed random access memory and may also include non-volatile memory, such as one or more magnetic disk storage devices, and portable storage devices such as flash memory that can be remotely located from the central processing unit(s) 302. In some embodiments, the memory 305 may store programs, modules and data structures, or a subset thereof that include an operating system 301, a communication module 303, a graphics module 307, a memory cache 308, a client applications module 310, a client synchronization module 320 and data 380.

The operating system 301 includes procedures for handling various basic system services and for performing hardware dependent tasks.

The communication module 303 connects the applications 209 to servers via the one or more communication network interfaces 306 (wired or wireless) and one or more communication networks, such as the Internet, other wide area networks, local area networks, metropolitan area networks, cellular networks and so on.

The memory cache 308 temporarily stores information temporarily for quick access by an active application. Examples of information stored may include metadata and other information specific to an application. Generally, when the application becomes inactive, the information is erased.

The client application modules 310 include one or more applications that can be executed on the client device 300. Some of these applications 310 are configured to interact with the server 200 to perform tasks related to communications, user interface management, application customization, and management of specific client applications including email, calendar, text messaging, media players or document editing or viewing software, etc. A client application is driven by the client device when in operation.

The client synchronization module 320 is used for synchronization of data for applications that can operate independently on the client device or the server. The client synchronization module 320 may include synchronization schemes specific to a single application or generic to more than one application. In one embodiment, the synchronization module 210 includes a downhill synchronization module 325, an uphill synchronization module 365, and a synchronization control 375. The functions of these modules correspond to their counterparts on the server.

The synchronization control 375 controls the operations of data synchronization in accordance with connectivity to a communications network, detection of unsynchronized data, or other conditions present when data synchronization takes place. In one embodiment, the client is configured to initiate a synchronization request to the server, although the reverse may be possible.

The downhill synchronization module 325 is responsible for synchronizing to the client data changes that have occurred on the server. The downhill synchronization module 325 on the client works with its server counterpart (described with reference to FIG. 2) to ensure that the data changes on the server are synchronized to the data on the client. Similar to the server counterpart, the downhill synchronization, in one embodiment, includes forward synchronization and backward synchronization. As described with reference to FIG. 2, the forward synchronization module 330 monitors data changes on the server as these changes occur chronologically and sends them to the client. The client backward synchronization module 340 monitors data changes on the server in order of priority or based on relevance of the data changes. Similarly, the order of priority and the degree of relevance are based on similar pre-determined criteria used in the server. Therefore, data changes on the server may be synchronized with the client device both chronologically and in order of priority. Other synchronization modules 350 may exist specifically for other applications which may include configurations customized for data in these applications.

The uphill synchronization module 365, similar to its server counterpart, is responsible for synchronizing data changes that have occurred on a client to the server. On the client, this uphill synchronization module 365 interacts with the server to send data changes that have occurred on the client and to ensure that the same changes are reflected on the server when the server sends back to the client the last CHO ID handled by the server.

The data module 380 includes data files that are used by applications in the application module 310 as well as data used for synchronization with the server. In some embodiments, the data modules 380 may include at least one of synchronization data 370 for purposes of data synchronization with the server, cached data 382, and a configuration specification 384.

The synchronization data 370 includes specific data such as a local/client history table 374, next backward synchronization token 372, the highest synchronized server history operation identification (SHO ID) 378, and other synchronization data 376 which may be specific to some applications. These data are used specifically for synchronization of the client device with the server.

The local/client history table 374 contains information about data changes on the client. Each entry in this table has a CHO ID and represents a specific data operation. Specifically, information in the local/client history table is used for uphill synchronization of the data with the client.

The next backward synchronization token (BST) 372 is the next synchronization token sent from the client to inform the server of the starting point for the next backward synchronization. The highest synchronized SHO ID 378 is sent from the client to inform the server of the starting point for the next forward synchronization. In other words, the highest synchronized SHO represents the starting point in the next set of changes (e.g., changes with SHO ID greater than the highest SHO ID 378) which are to be returned to the client.

Other client specific data 376 may be used for synchronization in generic applications or for specific applications. For example, different applications may have different criteria for their respective data synchronizations. These different criteria may be stored as other client specific data used for synchronization in other applications.

The cached data 382 represents data that is stored on the client. This may include data used for various applications and data to be synchronized with the server.

The configuration specification 384 includes specific configuration information about the client device. This information may be used to identify the client to the server or to other devices for purposes of synchronization, interactions, and in activation and operation of applications. For instance, information contained in the configuration specification may include, but are not limited to, client identification, device specification of the client, identification of application in which data is to be synchronized, and criteria for synchronization etc.

Data synchronization, in some embodiments, includes one or more independent synchronization mechanisms. Downhill synchronization is where server sends unsynchronized changes on the server to the client and uphill synchronization is where the client sends unsynchronized data changes from the client to the server. In some embodiments, downhill synchronization includes backward synchronization and forward synchronization. Backward synchronization synchronizes data that have never been synchronized with the client (i.e., data items on the server that have not been reflected on the client), whereas forward synchronization synchronizes change operations (i.e., ongoing data changes occurring since a prior synchronization operation). Each of these synchronization mechanisms may be separate and independent from each other, and they may operate serially or concurrently as appropriate. Again, this concept of data synchronization may be equally applicable to synchronization about email conversations and the individual messages contained within each email conversation and a set of related data (e.g., images, documents).

Figure 4:
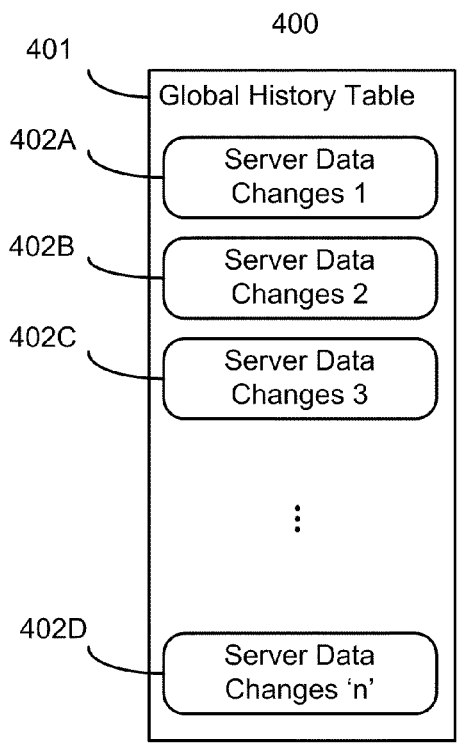
FIG. 4 is a diagram illustrating information contained in a global history table on the server in accordance with some embodiments of the present invention.

FIG. 4 is a diagram illustrating information contained in a global history table 401 on the server. The global history table 401 contains entries that refer to changes to data on the server and is used for forward synchronization. In some embodiments, every change to data on the server 402 has a unique identification which is known as a server history operation identification (SHO ID). In one embodiment, the server data changes 402A-D (corresponding to first through nth server data change)" may be ordered chronologically with the newest change on the top of the table and the oldest change at the bottom. Ordering, in this embodiment, is thus determined by occurrence in time of the change operation. Ordering in different ways, such as by priority, by relevance of the change operation, by category or type of change operation, etc. is also possible. During forward synchronization, change operations on the server are sent to the server in accordance with an order in the client history table.

Figure 5:
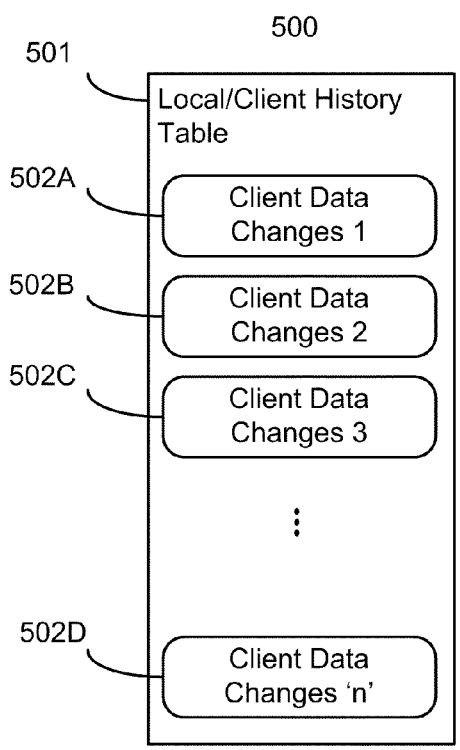
FIG. 5 is a diagram illustrating information contained in a local history table of the client in accordance with some embodiments of the present invention.

FIG. 5 is a diagram illustrating information contained in a local history table of the client. The local/client history table 501 contains changes to data on the client and is used for uphill synchronization. Each client data change 502 has a unique identification known as client history operation identification (CHO ID). In one embodiment, the client data changes 502A-D (corresponding to first through nth client data change) may be ordered chronologically with the newest change on the top of the table and the oldest change at the bottom. Similar to its counter part global history table 401 on the server, ordering of items in the client history table may be arranged different such as based on relevance, priority, and category of change operation etc. During uphill synchronization, the client sends new changes to the client in order which the operations are arranged.

Figure 6:
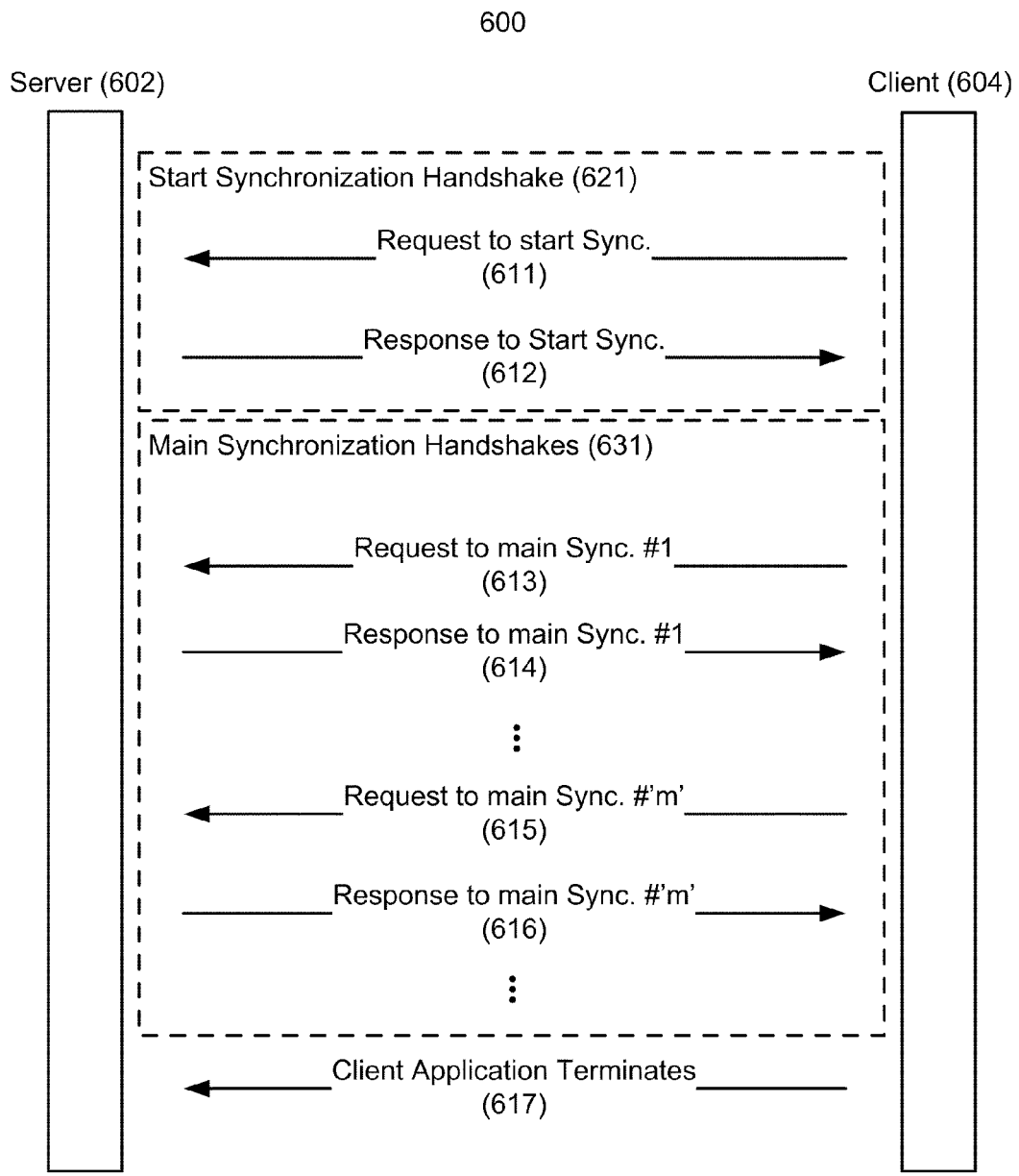
FIG. 6 is a diagram illustrating an exemplary synchronization interaction scheme between the server and the client in accordance with some embodiments of the present invention.

FIG. 6 is a diagram illustrating an exemplary synchronization interaction scheme 600 between the server 602 and the client 604. In some embodiments of a synchronization interaction scheme, a start synchronization handshake 621 takes place between the server 602 and the client 604 to initialize the actual data synchronization process which is represented here as main synchronization handshake 631. The start synchronization handshake 621 may occur prior to the first data synchronization, or after an extended period during which the client 604 does not communicate with the server 602 (e.g., out of range of communication network, client device powered down, application on client is terminated, or when the device or server is disconnected from a communication network).

The start synchronization handshake 621 serves to establish a starting point for data synchronization. Each start synchronization handshake has a request 611 and a response 612. In some embodiments, the request 611 originates from the client, and upon receipt of the request, the server sends a response 612. It should be appreciated that a start synchronization may be incorporated as part of main synchronization as presented in this disclosure, or eliminated entirely. Furthermore, a request may originate from the server instead of the client.

Main synchronization handshakes 631 occur after data ranges for synchronization are established on the server. Similar to the start synchronization handshake, each main synchronization begins with a request 613 sent from the client. After receipt of the request 613, the server sends a response 615. In some embodiments, the main synchronization request 613 includes data changes from the client to be synchronized with the server, and the main synchronization response 615 includes data and change operations on the server from the server to be synchronized with the client. Main synchronization terminates either when there is a long disconnection or when the program ends 617.

Figure 7A:
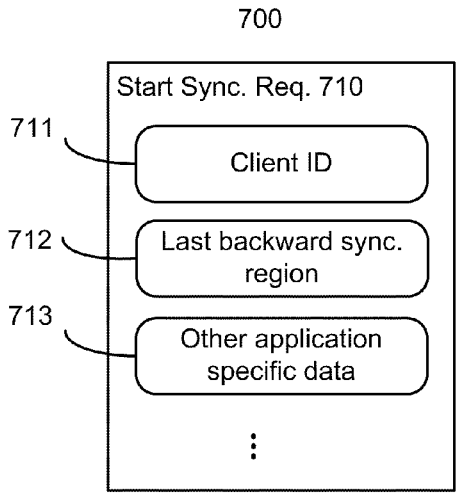
FIGS. 7A and 7B are diagrams illustrating information contained in the start synchronization interactions between the server and the client in accordance with some embodiments of the present invention.
Figure 7B:
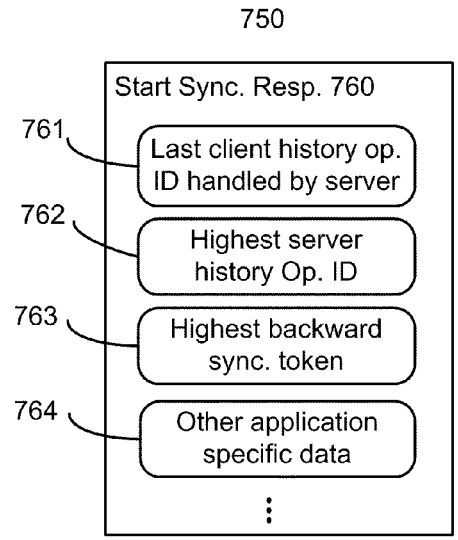

FIGS. 7A and 7B are diagrams illustrating information contained in the start synchronization handshakes between the server and the client. Information described includes those contained for downhill synchronization (forward and backward synchronization) and uphill synchronization. FIG. 7A is an example of a start synchronization request 710. Information contained in the start synchronization request 710 may include a client ID 711, the last backward synchronization region 712, and other application specific data 713.

The client ID 711 identifies the client to the server so the server can retrieve information corresponding to the matching client. The last backward synchronization region 712 contains the last range of data from the server that was last synchronized with the client in backward synchronization. The backward synchronization region 712 contains two backward sync tokens (BST) to define the beginning and ending of the data range. Each BST uniquely identifies a unique datum on the server. If no synchronization has taken place (e.g., first synchronization attempt), the client will have no range. Two BSTs will be present in other cases (e.g., after a long period of disconnect). Other application specific data 713 may include specific configuration information for synchronization. For example, priority information about which items to synchronize first, filters for synchronization particular data, object, or items, and any other criteria for synchronization can be included. Configuration information may be specific to applications.

FIG. 7B is a diagram of a start synchronization response 760 sent by the server to the client acknowledging the start synchronization request 710. Information contained in the start synchronization response 760 may include the last client history operation identification acknowledged by the server 761, the highest server history operation identification 762, the highest backward synchronization token 763, and other application specific data 764.

The last client history operation identification (CHO ID) acknowledged by the server 761 identifies the last data change from the client acknowledged by or synchronized with the server in the last uphill synchronization. The purpose of this CHO ID is to assist the client in determining a new range for next uphill synchronization.

The highest server history operation identification (SHO ID) 762 represents the most recent server data change operation and may serve as the next SHO ID for forward synchronization. The highest backward synchronization token (BST) 763 represents the highest priority datum, object, item or data change on the server not synchronized with the client. This is also the first item for synchronization at the next backward synchronization. In some embodiments, priority or relevance of an event/data change for synchronization may be based on the recency (i.e., time of occurrence) of the data change, the status of an item associated with the data change (e.g., new message in an email application might have a higher status/priority than a contact update), and labels or tags associated with an item associated with the data change (e.g., in some embodiments, the item could have an associated label set to "important" or "urgent" or "always download"), or a combination of any of these or similar factors. Other specific data 764 may include configuration information for synchronization of data associated with specific applications.

Figure 8A:
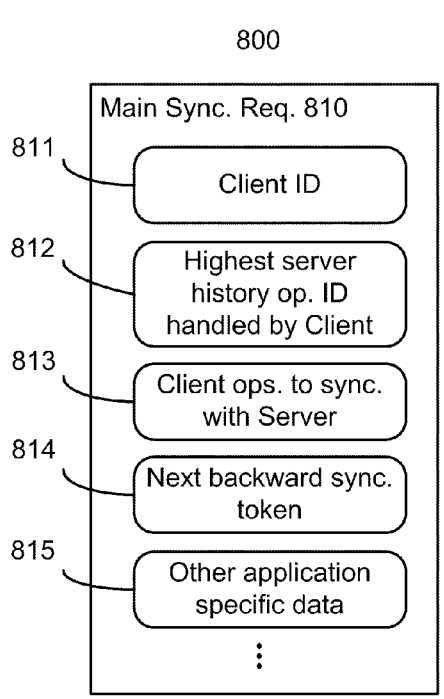
FIGS. 8A and 8B are diagrams illustrating information contained in the main synchronization interactions between the server and the client in accordance with some embodiments of the present invention.
Figure 8B:
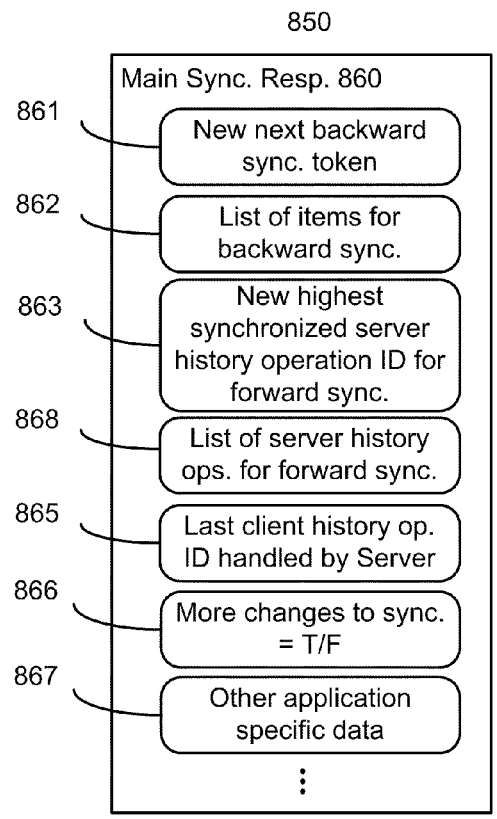

FIGS. 8A and 8B are diagrams illustrating information contained in the main synchronization handshakes between the server and the client. FIG. 8A is a diagram of a main synchronization request 810 sent by the client to the server. In some embodiments, the main synchronization handshakes occur immediately after ranges of information are established for data synchronization after start synchronization handshake. Main synchronization handshakes may repeat indefinitely so start synchronization handshakes are not necessary, as long as the client and the server are connected. In one embodiment, each main synchronization request 810 includes a client ID 811, the last server history operation (SHO) ID handled by the client 812, the client data changes to synchronize with the server 813, the next backward synchronization token (BST) 814, and other application specific data.

The client ID 811 is used to identify the corresponding set of data on the server for data synchronization. The last SHO ID handled by the client 812 identifies the last data change synchronized with the client and helps to determine the next set of server data changes on the global history table for forward synchronization with the client.

The client data changes to be synchronized with the server 813 are also sent in the main synchronization request from the client to the server. In some embodiments, a maximum number limits the number of client data changes to be sent to the server in the uphill synchronization to reduce time for synchronization.

The next BST 814 represents where the next backward synchronization should start. Unless there is a long period of disconnect, backward synchronization starts at one point and moves from high to low priority in one direction until all relevant data have been synchronized. In other words, backward synchronization is focused on synchronizing a set of data items existing on the server starting a particular time point in time. Therefore, the next BST 814 would typically be lower in priority than the previously sent next BST 814 that was synchronized. However, such is not the case when synchronization resumes after a long period of disconnecting from the server, where the next BST 814 would be the highest priority datum at the time of reconnection, as this next BST 814 represents the highest priority data item at the particular unique time point at which synchronization begins. Therefore, as long as the main synchronization handshakes repeat without interruption, backward synchronization would move uni-directionally and each next BST 814 representing a new starting point would be lower in priority than all previously sent next BST 814. Once backward synchronization terminates, it will not re-initiate unless the client and the server are disconnected and then reconnected again. Other application specific data may include configuration information for synchronization specific to one or more applications.

FIG. 8B is a diagram of a main synchronization response 860 sent from the server to the client in response to the main synchronization request 810. Information contained in the main synchronization response 860 may include the new next BST 861, a list of items for backward synchronization 862, a next highest SHO ID 863, a list of SHO for forward synchronization 868, the last CHO ID handled by the server 865, an indicator of whether there are more unsynchronized changes 866, and other application specific data 867.

The list of items for backward synchronization 862 includes a list of unsynchronized server data items sent to client for synchronization in current backward synchronization. The list of items in order from highest priority to lowest priority and may be limited to a maximum number to minimize the time for data synchronization. In some embodiments, the items are arranged and ordered on the server, in other embodiments, the ordering of the items are determined in real time as the items are being queued and sent to the client.

In some embodiments, the new next BST 861 indicates the next highest priority unsynchronized datum, object, item, or change after the last item in the list of items for backward synchronization 862. This new next BST 861 marks the beginning of the next backward synchronization, assuming all data in the list 862 are successfully synchronized from the server to the client. The new next BST 861 is a suggested BST for the client to send back to the server to identify beginning of the next unsynchronized data range for next backward synchronization. In case of a long disconnect, assuming all data in current backward synchronization are successfully synchronized, the client may send this new next BST 861 when reconnected. However, if current backward synchronization is interrupted and not all data is completely synchronized, the client will have an option to send to the server the last BST successfully handled by the client (or successfully synchronized with the server) to the server instead for the server to determine the proper starting point.

The list of server history operations (SHO) or forward synchronization 868 is the list of operations performed to server data since last synchronization. This list represents changes and operations performed to data. In some embodiments, these changes and operations may refer to changes and operations to data previously synchronized with the client, receiving or creation of new data, or changes and operations to data that have not been synchronized with the client etc. In one embodiment, these change operations are separately identified from the data itself so that merely the changes or operations can be synchronized with the client independent of the data. In another embodiment, the data including the change and operation may be selected for synchronization. In some embodiments, this list of SHOs are arranged and ordered on the server, in other embodiments, the ordering of the items are determined in real time as the items are being queued and sent to the client.

The new highest synchronized SHO ID 863 for forward synchronization represents the highest SHO ID in the global history table that the client assumes has completed forward synchronization with the server assuming that the list of SHO ID 868, representing the data changes to be synchronized with the client, is successfully forward-synchronized from the server to the client. In some embodiment, this new highest synchronized SHO ID 863 may be a data change on the global history table actually synchronized with the client. In other embodiments, this new highest synchronized SHO ID 863 may in fact be a data change on the global history that merely marks the end of the range of data changes to be synchronized with the client but in fact will not be forward synchronized with the client.

Upon successful completion of this forward synchronization, this new highest SHO ID 863 will be sent back from the client to the server in the main synchronization request as the highest SHO ID handled by the 812. If forward synchronization was interrupted and not carried to completion, the client will sent back the highest SHO ID in the list of SHO ID 868 that has been successfully synchronized for determination of the proper starting point for the next forward synchronization. The rationale of this mechanism is to prevent the clients from requesting operations that have already been determined to be irrelevant to client.

In case of a long disconnect, assuming all change operations in current forward synchronization are successfully synchronized, the client may send this new SHO ID when reconnected. One should appreciate that forward synchronization synchronizes what has changed after synchronization was first initiated. Forward synchronization does not end like backward synchronization and forward synchronization may synchronize changes to data or new data received or created after synchronization has initiated.

One unique aspect of the current invention is the ability to simultaneously implement backward synchronization and forward synchronization. This implementation allows data items and changes to data items to be simultaneously synchronized both going backward in time (backward synchronization) and forward in time (forward synchronization) for both speeding up the synchronization processes as well as ensuring that all data items and changes to data items of priority are synchronized in a timely manner.

The last CHO ID handled by the server 865 is the CHO ID of the last client data change synchronized on the server. When received, this informs the client to start at the next highest CHO ID on the client history table to begin next uphill synchronization. In another embodiment, as described earlier, this next highest CHO ID may be sent to the server from the client, so if all the data changes from the client are synchronized with the server, this next highest CHO ID may be sent directly instead. Similarly, a maximum number of client data changes may be used to limit the number of items sent from the client to the server to minimize the time for data synchronization.

An indicator 866 will be sent to the client indicating whether there are data changes on the server that are unsynchronized and not included in the current synchronization. In some embodiments, if there are remaining unsynchronized items, the main synchronization process will immediately repeat again beginning with the main synchronization request from the client. If there is no remaining item for synchronization, both the client and the server will enter standby mode until the next main synchronization occurs.

Other application specific data 867 may include data that are used for synchronization in particular applications.

FIGS. 9A and 9B are diagrams illustrating the relationship between the different lists of data items and the corresponding history tables in the server and the client respectively. FIG. 9A is a diagram of a list of server data 910 and the corresponding global history table 920. The server data 910 represents a list of data from which at least a portion corresponds to data stored on a specific client.

Each datum in the list of server data is associated with a unique identification (e.g., backward synchronization token (BST)) and no two data have the same BST ID. The BST may, in one embodiment, be same as a date/time stamp; in another embodiment, it may be defined differently. In the illustration, each BST is identified by an alphabet (e.g., item a, item b, etc.), each representing a datum. Data may associate with any application, including, but not limited to text, media, graphics. In some embodiments, there may be one list of data including different types of data such as email messages, contact information, calendar information etc. In other embodiments, there may be different lists each representing a different type of data. In one embodiment, there is one global history table that documents all changes to data for all data. In other embodiments, there may be different global history tables for different data that are logically partitioned from each other. In other words, data in one partition will have a same global history table, and data in a second partition will have a different global history table. In some embodiments, data may be partitioned differently based on data types.

The server data 910 may be arranged in any order, such as by priority, recency, relevance, or category etc. For instance, arrangement by priority suggests that data items are ranked in order based on one or more criteria. In one embodiment, arrangement by priority may be similar to arrangement by recency, where data with more recent time-stamps are ranked higher than data with older time stamps. For instance, email messages more recently received or created will have higher priority than older messages. Relevance may suggest items which are more desired by a user of the client device. For example, in an email context, unread messages, messages received within a week, or even messages concerning a particular subject may be more relevant to a user than others. Category suggests that different data groups whether for a same or different application, including but not limited to categories such as email information, calendar information, contact information etc. may be ranked before being synchronized.

The global history table 920 contains entries corresponding to historical records of server history operations (SHO) performed on server data 910. Each SHO in the global history table 920 has a unique identification. The SHO ID may be assigned based on when the operation occurred or by in accordance with a specific set of rules. Changes to data generally correspond to time such that successive changes to the same data can be properly identified. There are different ways to deal with changes to data in forward synchronization. In some embodiments, changes to data moving forward in time are dealt with individually. This implementation requires that all related changes are to be handled chronologically as they occur. In another embodiment, a list of all data items having changes is maintained and changes to these data items can either be replaced entirely by sending from the server the list of items with their changes or by sending the list of changes for the list of items. If the list of changes for the list of items is sent, changes that are related to each other should also be handled chronologically as they occur.

For purposes of illustration, the relationship between the operations in a global history table 920 and server data 910 is explained in context of an email application. For example, the SHO 921 indicates that a label is added to item d, an email message, on the server. Similarly, the SHO 922 and 928 also indicate that a label has been added to item f and item g, also email messages on the server, respectively. The SHO 923 and 927 indicate that a star has been added to email messages on the server represented by items j and k respectively. Still, receipt of new messages in the SHO 925, 926, and receipt of an invitation on the server in SHO 929 point to new items o, p, and q on the server respectively. When a message on the server is edited, such as item m, the change to the message is recorded in the SHO 924. Operations may be applied to all data, synchronized or unsynchronized. Operations may also represent user changes made to data (e.g., add a label, add a star, etc.) or inherent system changes (e.g., newly received email, archived email message, filtering rules, etc.)

FIG. 9B is a diagram of a list of client data 930 and a local/client history table 940. Each datum on the client data list 930 has a unique identification (e.g., a token ID). For purposes of illustration, each item on the client data list 930 is labeled with a numeral (e.g., item 2020, item 2021 etc.). However, in actual implementation, client data 930 correspond to at least a subset of data in the server data 910 where corresponding data are identical (e.g., same BST ID) and contain the same information. The synchronized client data 930 is generally an identical duplication of those on the server, including all operations. Since memory capacity on the client is often not as abundant as memory capacity on the server, the list of client data 930 is at least identical to a portion of the server data 910 after successful synchronization.

In one embodiment, ordering of client data on the client device may be arbitrary and in any order. This embodiment is where client data are not directly synchronized with the server, but instead, the data changes or change operations are synchronized with the server. Change operations are more comprehensive than data changes because data changes include but are not limited to data creation, data deletion, data modification etc. operations applied to data. Therefore, ordering of client data 930 is unnecessary for the purpose of data synchronization and may be arranged based on any of priority, recency, labels, relevance, or any other configurable category.

The client history table 940 maintains a record about client history operations (CHO) performed on at least portions of the client data 930. CHO on the client are independent to SHO on the server; they refer to independent operations and are not directly synchronized with each other. However, the effects of the CHO and SHO on data are synchronized by the downhill and uphill synchronizations.

For purposes of illustration, relationship between the operations in a client history table 940 and client data 930 is explained in context of an email application. For instance, CHO 942 on the client history table refers to item 2007 being deleted on the client, CHO 943 represents receiving a new invitation on the client which corresponds to item 2011, CHO 944 represents a message or item 2018 on the client which is starred by the user, labels are added via CHO 945 and 948 to items 2017 and 2016 on the client respectively, and CHO 946 and 947 refer to receiving new messages as items 2020 and 2021 on the client respectively.

Unique identification of data and ordering of data changes or operations on both the server and client are important for purposes of synchronization. Identification and ordering are important for distinguishing a particular range where data synchronization stopped and where it should start again. For example, server data 910 are arranged in order of priority where the higher priority data (e.g., items s, r, q) are listed before lower priority data (e.g., items n, o, p). Similarly, both SHOs in the global history table 920 and CHOs in the client history table 940 are arranged in order, for example, in chronology to when each operation was performed where later operations are place above earlier operations. Identification and order are important for identifying a next unsynchronized range of information for synchronization whenever data synchronization stops and re-starts.

Figure 9C:
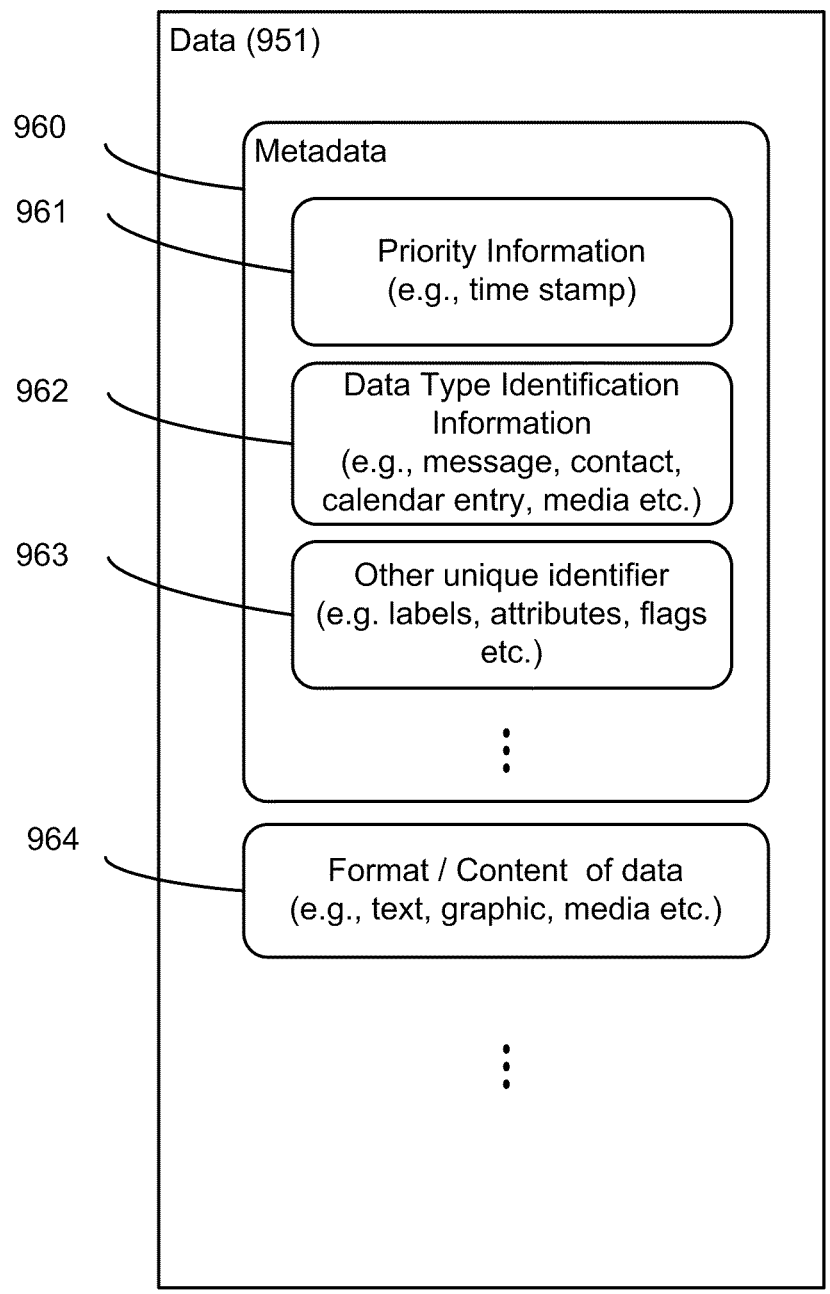
FIG. 9C is a diagram illustrating an exemplary form of data that can be synchronized between a server and a client in accordance with some embodiments of the present invention.

FIG. 9C illustrates exemplary data that can be synchronized between a server and a client. Datum 951 is shown in FIG. 9C having metadata 960 and content 964. Metadata 960 include, but are not limited to, a unique identifier 961, data type information 962, and other forms of identification 963.

For purposes of illustration, datum 951 may be an email message, an email conversation, a contact, a calendar entry, or any other data object or data file such as a JPG file, a TIFF file, a text file etc. In one embodiment, a unique identifier 961 may be a time stamp when the datum is created or modified and may be same as a BST ID as described in FIGS. 9A and 9B.

The datum may be further categorized based on its data type identification 962 and prioritized or ordered in the process of data synchronization. For example, the datum may be classified as a contact entry, a message, a calendar entry, a document, a text file, an image file etc. Similarly, other identification 963 such as a label, attribute, flag etc. may also be used as an additional condition for prioritizing and ordering during data synchronization. For purposes of exemplary illustration, in context of email, a label may be assigned by system or user and may include but is not limited to all unread messages, trash, sent messages, or other user defined categories such as work, leisure, sport etc.

Content 964 forms the remaining of the datum, and in the case of an email, it may be the text of a message; in the case of a contact, it may include different fields in a contact such as name, phone number, address, email address etc.; and in the case of a calendar entry, time of an appointment, subject of an appointment, and any information associated with the appointment.

As described earlier data synchronization, in some embodiments, may be described as three different processes. Each process is separate and operates independently of the others. In a preferred embodiment, they operate concurrently to increase speed of data synchronization. In other embodiments, each may be activated separately, one at a time, two at a time, in arbitrary sequence as needed, in order of priority, or in any configuration that is appropriate. Each of these processes are described separately below, but one should appreciate that all three can be combined and applied together as described in context of the start synchronization and main synchronization handshakes in FIGS. 7 and 8.

Downhill synchronization incorporating both forward and backward synchronization is described in FIGS. 10A-10F. The individual process of backward synchronization is described in FIGS. 11A-11C, whereas the individual process of forward synchronization is described in FIGS. 12A-12C. Uphill synchronization is described in FIGS. 13 and 14. For purposes of exemplary illustration, the synchronization processes will be explained in the context of an email application, one should appreciate that it may equally be applicable in other applications.

FIGS. 10A-10B, 10W, and 10X describe the initiation of downhill synchronization between a server and a client. FIG. 10A shows a diagram of a list of server data 1010A and a global history table 1010B at a state before data synchronization re-initiates after a long period of disconnect or when data synchronization has never occurred between the server and the client. The dotted line represents a state at initiation of start synchronization or after last main synchronization occurred. In this illustration, main synchronization is where both backward and forward synchronizations take place and where data is synchronized from the server to the client. In other embodiments, main synchronization may also include concurrent operation of uphill synchronization.

Each item in the list of server data 1010A has a unique backward synchronization token (BST). In one embodiment, the list of server data 1010A is arranged in an order of priority, with the highest priority on top (e.g., BST n) and lowest priority at the bottom (e.g., BST a). Sorting of the data into priority may be performed prior to initiation of or at the time of the data synchronization. Data is synchronized and transmitted in order from high to low priority. In one embodiment, backward synchronization of data in order of priority proceeds in one direction until all unsynchronized data at the point of initiation have been successfully synchronized. Backward synchronization in this embodiment does not return to synchronize data added after the point of synchronization unless the application terminates or if there is a long disconnect. In this embodiment, backward synchronization does not synchronize change operations performed on data. Also, backward synchronization priority order may be arranged based on relevance, recency or other criteria.

Each data change operation in the global history table 1010B has a unique identification (SHO ID). In some embodiments, SHOs in the global history table 1010B are arranged in chronological order according to when each SHO occurred, so old operations appear at the bottom and new operations appear at the top. In the illustration, the earliest operation is SHO 1 and the latest is SHO 18. In one embodiment, these change operations represented by SHOs are forward synchronized in same order arranged in the global history table 1010B.

For purposes of illustration, in one embodiment, during data synchronization (e.g., main synchronization) both backward synchronization and forward synchronization occur simultaneously. If data synchronization has never occurred, backward synchronization begins at the highest priority BST (e.g., BST n) and moves to lowest priority (e.g., BST a), and forward synchronization starts from SHO 1, SHO 2 . . . to SHO 18 in chronological order. In some embodiments, maximum numbers of data and SHOs are sent at each time.

FIG. 10W illustrates the handshake between server and client during a start synchronization handshake to initiate data synchronization. Similar to what was described in FIGS. 7A, 7B, less the portions of information for uphill synchronizations. In the first start synchronization handshake, the client will merely send a client ID in request 1047 of FIG. 10W. The server replies with response 1048 containing the highest BST (e.g., BST n) and the highest SHO in the global history table, (e.g., SHO 18). In the subsequent main synchronization handshake as illustrated by FIG. 10X, the client request 1051 will include the client ID, the highest BST (e.g., BST n) on the server and highest SHO (e.g., SHO 18) received from the start synchronization response 1048. The server replies with response 1052 that includes items BST n, m, l, k for backward synchronization and no items for forward synchronization. The number of items returned in both synchronizations may also be limited by a same or different predefined maximum number. Response 1052 also includes the new next BST (e.g., BST J) and highest handled SHO ID (e.g., SHO 18) for next main synchronization.

FIG. 10B shows a status of data and global history table on the server after the first main synchronization. Server BST n, m, l, k and change operations SHO 18 and those other change operations before SHO 18 are shaded, indicating that these no longer need to be synchronized with the client. In some embodiments, the server maintains a record of all data synchronization. The record may be maintained as part of the server data list and the global history table, or it may be separately stored. By tracking the range of data on the server and range of change operations on the server that have been successfully synchronized with the client, these same data ranges and change operations ranges will be skipped over when they are encountered in future data synchronizations. While all data are stored until they are deleted by the user, in one embodiment, an item in the global history table may be deleted after it has been synchronized to all existing clients. The operations of these synchronized SHOs will have been incorporated into the clients' local data, and therefore will not be needed in future synchronization.

FIGS. 10C-10D, 10Y are diagrams illustrating the concept of main synchronization under general operation condition where there is no long disconnect between the client and server. In some embodiments, as long as the application or the connection between the client and server is active, main synchronization continues regularly and indefinitely.

FIG. 10C shows the same state of data and data change operations on the server as in FIG. 10B with new data and new change operations added after the first main synchronization (as indicated by the dotted line). For example, new messages corresponding to BST o and BST p arrived on the server while the message associated with BST f has been modified by SHO 20. Arrival of new messages BST o and BST p are reflected as SHO 19 and 21 respectively in the global history table. One should appreciate the comprehensiveness of change operations which represent data addition, deletion, and any manner of modification of data, synchronized or not. In other words, data operations in the global history table correspond to every aspect of every datum in the server data list.

In the second main synchronization process as shown in FIG. 10Y, the client sends a request 1053 to the server with the next BST (e.g., BST j) and the highest synchronized SHO handled by the client (e.g., SHO 18). Responding to the client request 1053, the server will send a communication 1054 to the client containing the next set of server data (e.g., BST j, i, h) and SHO (e.g., SHO 19, 20, 21) in the backward and forward synchronization processes, respectively. In addition, the communication will include an indication of whether there is any unsynchronized data and change operations on the server, and if there is, as in this case (e.g., BST g and SHO 21), they will be sent to the client as well.

FIG. 10D is a diagram of the state of the data on the server 1010A and the global history table 1010B after the second main synchronization. All the synchronized data (e.g., BST h to p) and the synchronized SHO (e.g., SHO 18-21) are shaded. As described earlier, in some embodiments, the synchronized SHO may be deleted from the global history table either immediately or at a pre-defined time after the data synchronization.

FIGS. 10E-10F, 10Z are diagrams illustrating data synchronization after a long disconnect between the server and the client. FIG. 10E shows new items (e.g., BST q, r) and new operations (e.g., SHO 22-29) added to the server since the last (e.g. second) main synchronization, as illustrated by the dotted line. New SHOs include data operations performed on old but unsynchronized message (e.g., SHO 22 for operation on BST c), addition of new items to the list of server (e.g., SHO 23, 24 corresponding to additions of BST q, r), modification of data previously synchronized (e.g., SHO 25 for operation on BST 1), and modification of unsynchronized data (e.g., SHO 29 for operation on BST u).

Omitted from the figure is the occurrence of start synchronization by the client to the server to initiate data synchronization. In some embodiments, start synchronization may be an optional process for the client and server including the client ID and the last backward synchronized region (e.g., BST p through h) as represented by the starting point of that region (e.g., BST p) and end point of that region (e.g., BST h) In response, the server replies with a communication including the highest BST (e.g., BST v) and the highest SHO (e.g., SHO 29) from the server.

So, in response to the start synchronization, main synchronization takes place as illustrated in FIG. 10Z, the main synchronization handshake. After start synchronization, the client chooses information to send to the server in the main synchronization request 1055. The main synchronization includes the next highest BST (e.g., BST r) and the highest synchronized SHO (e.g., SHO 21). In response to the main synchronization request 1055, the server sends back items BST r, q, g, fin backward synchronization from high to low priority, skipping over the last synchronized region BST p through h, and chronological changes to data corresponding to SHO 22, 23, 24 in forward synchronization via main synchronization response 1056.

In some embodiments, the backward and forward synchronization processes share enough information about each other's process to ensure not to synchronize the same data and/or change operation twice to maintain efficiency. In one embodiment, this intelligence is made possible because the operations performed on the data and the data are separately distinguished. For example, when an item (e.g., email message) is added to the list of data on the server, a corresponding addition operation is recorded in the global history table. Similarly, if the same email message is modified, like having a label added, the label adding is registered as a separate data operation on the global history table.

The concept of separate synchronization of data and change operations may be illustrated by at least three different scenarios. First, if the email message has previously been synchronized by backward synchronization first before the user added the label, then the forward synchronization will skip the message adding operation but will synchronize the label adding operation. Second, if the email message has not been previously synchronized, if backward synchronization reaches the modified and unsynchronized email message, both the modification and the message itself are synchronized by backward synchronization and forward synchronization will skip both message adding and label adding operations. Third, if the email message has not been synchronized and the message adding operation was reached in forward synchronization before the backward synchronization of the data, the unsynchronized and unmodified message is synchronized first by the message adding operation, and the backward synchronization of the data will be skipped. The label adding operation will be added according to when it occurred, whether it is immediately after the message adding operation or how ever much time after the message adding operation.

Concurrent operation of forward and backward synchronization ensures fast and efficient data synchronization. Forward synchronization permits each and every change operation performed on server data be documented; it is focused on comprehensively covering every aspect of data operations performed to the data on the server. Backward synchronization is concerned with synchronizing data on the server in an order of priority so that higher priority data can be synchronized before lower priority data to the client. While backward synchronization aims to synchronize the highest priority information which may be of most importance to a user of the client device, forward synchronization ensures that no operation on data is left out of the synchronization. As these two processes occur concurrently and share information about the other synchronization process, data synchronized by one process will not be synchronized by another, allowing each process to help the other to make the entire data synchronization process faster and more efficient. Furthermore, since data and change operations that overlap will be addressed by one operation and skipped by the other, in a short time, after backward synchronization is completed, forward synchronization will be left to synchronize all remaining change operations to the server data in chronological order, as long as there is no long disconnect between server and client. When there is a long disconnect, backward synchronization will take place and helps to synchronize the high priority data that are unsynchronized and helping forward synchronization to catch up in the process. By synchronizing high priority server data changes to a client via backward synchronization in this manner, should the client go offline before backward synchronization is complete, the user of the client will have available for offline use the highest priority data, however priority is defined in accordance with different embodiments.

Figure 11A:
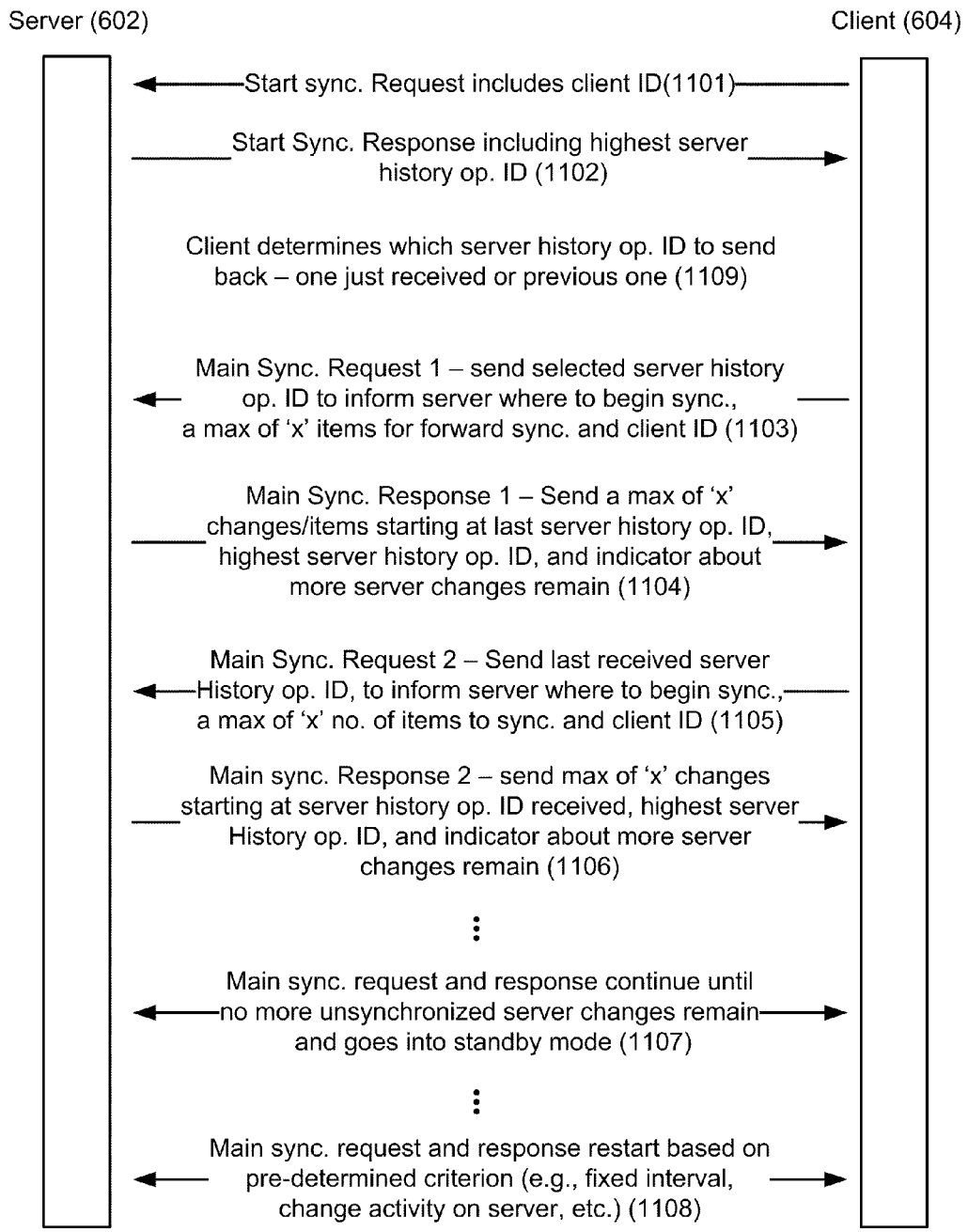
FIG. 11A is a diagram illustrating an exemplary interaction scheme between the server and the client during forward synchronization in accordance with some embodiments of the present invention.

For a better understanding of the forward and backward synchronization schemes, each synchronization process will be described individually. FIG. 11A illustrates an exemplary forward synchronization interaction scheme between client and server. In some embodiments, a start synchronization handshake initiates synchronization when an application is started or when an application is active but there is a long period of disconnect, predefined in terms of a certain number of minutes or hours.

Start synchronization may serve as initiation for synchronization. It is only needed to start the synchronization process, but in our current embodiment it is also used after a long disconnect. As described before, client sends a start synchronization request 1101 to the server that includes a client ID to identify the client to the server, no items in the previously synchronized range is necessary for forward synchronization. The server replies with a start synchronization response 1102 including the next highest server history operation identification (SHO ID) to the client. This SHO ID represents the most recent operation performed on data in the server. The client decides which SHO ID to send back to the server, the one just received, or another one that is in the client before the start synchronization. In the case of a long disconnect, the client sends the one that is in the client resulting from a previous forward synchronization.

Main synchronization handshake follows the start synchronization handshake. In some embodiments, main synchronization is initiated by a main synchronization request sent from the client to the server. In other embodiments, main synchronization may be initiated by a request from the server, or with no request at all. In FIG. 11A, client sends a main synchronization request 1 (1103) including a client ID and the highest synchronized SHO ID to identify a starting point in the server global history for synchronizing a maximum number of "x" items from the server to the client. The server replies with a main synchronization response 1 (1104) that includes a maximum of "x" operations from the global history table beginning at the SHO ID in main synchronization request 1 (1103), the new highest synchronized SHO ID, and an indicator about whether more server changes remain. In a different embodiment, the server may maintain enough information to make sure that it does not send down any changes that have already been acknowledged as being handled by the client.

Under normal operating conditions where there is no long disconnect between client and the server, main synchronization repeats immediately as long as there is remaining unsynchronized data or change operations. This includes sending a main synchronization request 2 (1105) from client to the server, including the next highest synchronized SHO ID received from the server in a previous main synchronization response (e.g., main synchronization response 1 (1104)), the client ID, and the maximum number of items "x" for transmission from the server. The server will reply with a main synchronization response 2 (1106), including "x" or less operations from the server, an indicator about whether more unsynchronized operations remain on the server, and if present, the SHO ID of the next unsynchronized operation on the global history table.

The main synchronization request and response handshake will continue indefinitely as long as there are unsynchronized operations on the server or there is an active connection between the server and the client. When there are no more unsynchronized change operations on the server, frequency of the main synchronization handshake may reduce. When not in active synchronization mode, the client and the server will enter standby mode 1107. As long as any connection interruption does not extend beyond a predefined period of time, the main synchronization handshake will repeat based on one of a number of pre-determined criteria, including, but not limited to a fixed interval or activity on the server etc 1108.

Figure 11B:
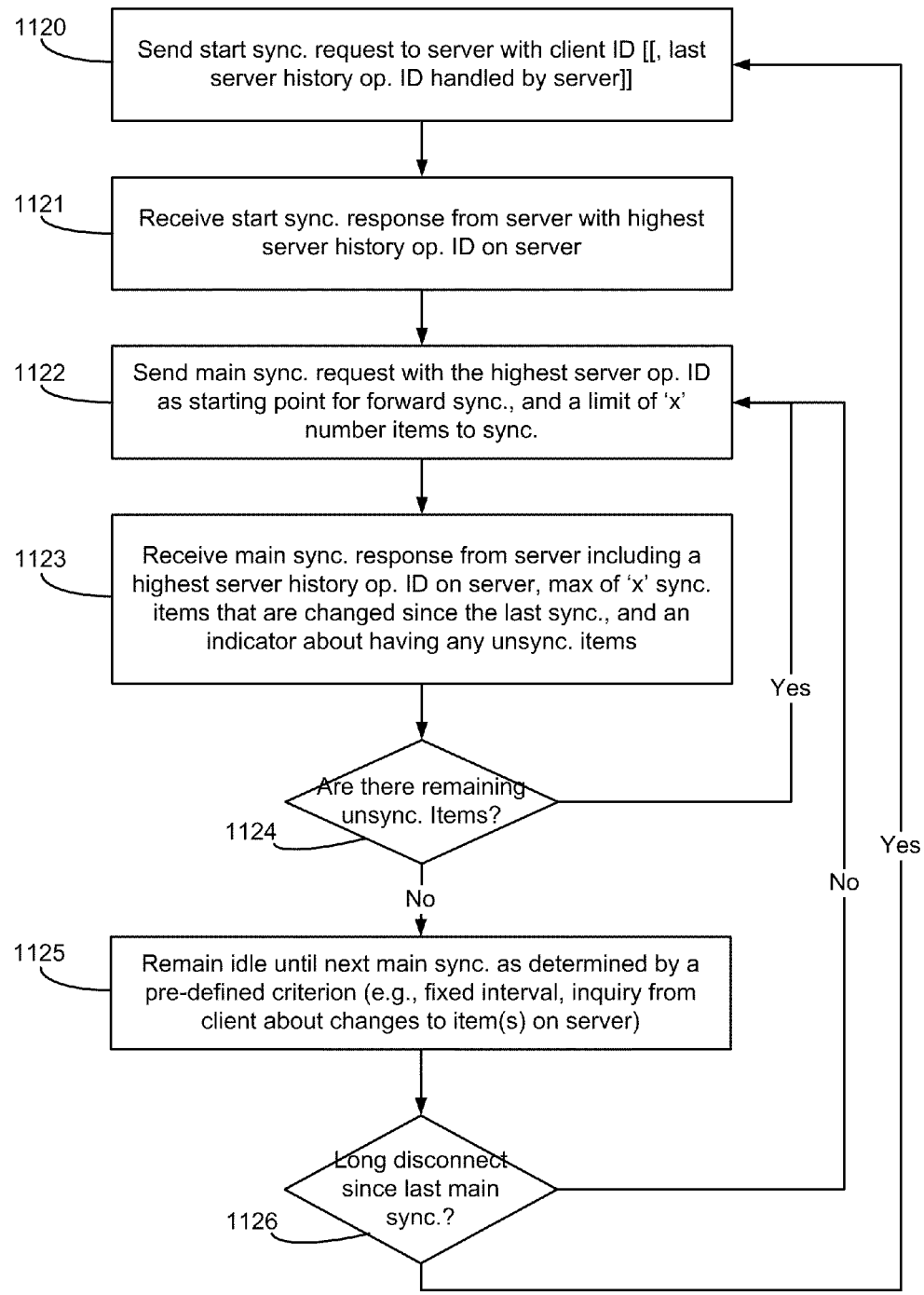
FIG. 11B is a flow diagram illustrating an exemplary method of forward synchronization at the client in accordance with some embodiments of the present invention.

FIG. 11B is a flow diagram illustrating an exemplary method of forward synchronization at the client. In some embodiments, the client initiates data synchronization by sending a start synchronization request to the server with client ID 1120. In response, the client receives a start synchronization response from the server containing the highest SHO ID on the server 1121. The client makes a determination about which SHO ID, one on the client from a previous main synchronization, or one just received from the server, to send to the server to initiate forward synchronization. The client sends a main synchronization request 1122 including the client ID, the selected SHO ID to the server to establish a starting point in the global history table for synchronizing operations, and a limit of "x" operations to be sent from the server. The client then receives a main synchronization response 1123 from the server including maximum of "x" operations previously unsynchronized with the client, an indication about any remaining unsynchronized items, and next highest unsynchronized SHO ID. Base on the main synchronization response, the client determines if there are unsynchronized items remaining in block 1124. If there are unsynchronized operations, the client initiates another main synchronization request as shown in block 1122; if there is no unsynchronized operation, the client remains idle until the next main synchronization is activated as determined by a pre-defined criterion in block 1125. If there is a long disconnect since the last main synchronization as shown in block 1126, start client will initiate start synchronization again as in 1120; if there is not a long disconnect, the client initiates a new main synchronization request according to the pre-defined criterion.

Figure 11C:
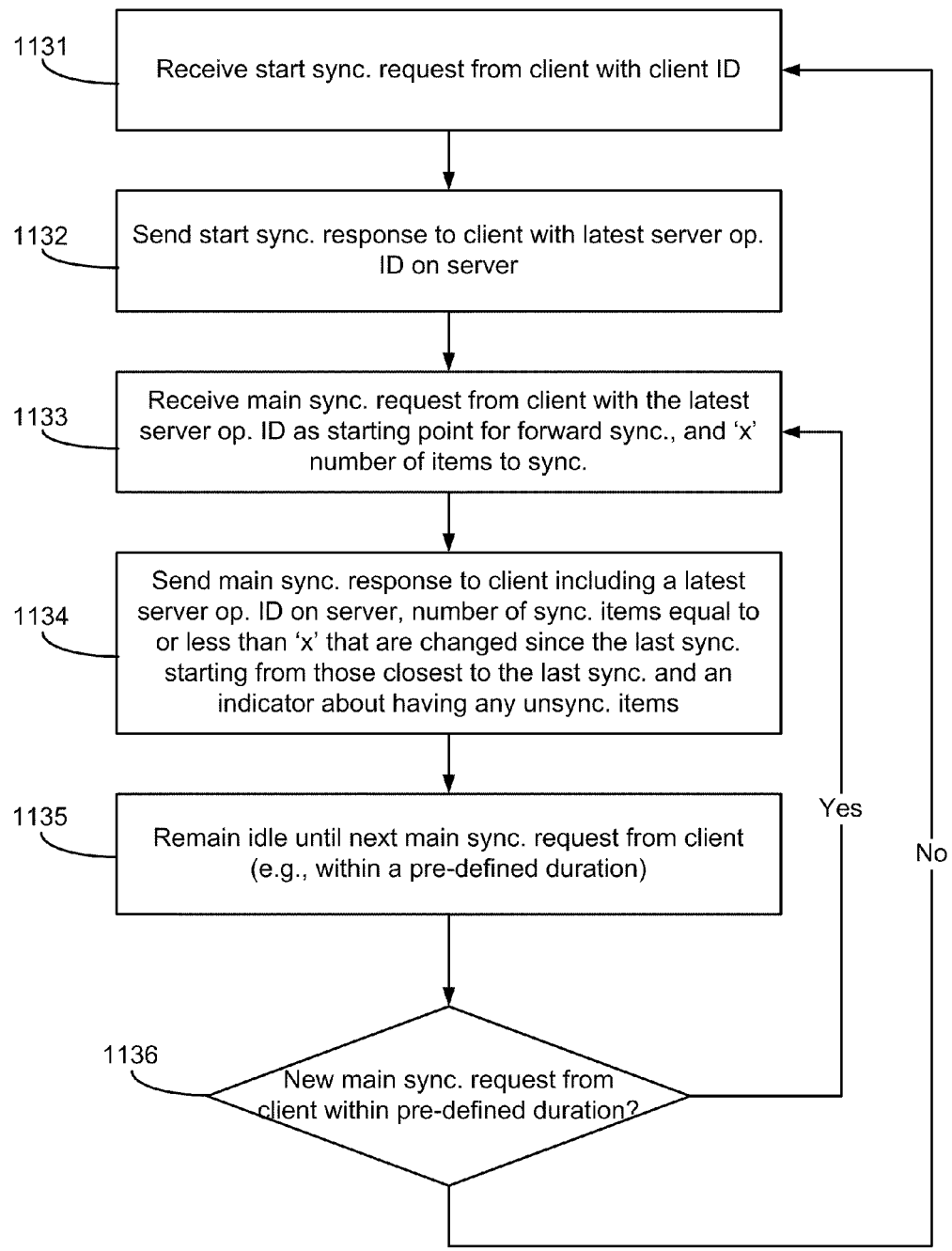
FIG. 11C is a flow diagram illustrating an exemplary method of forward synchronization at the server in accordance with some embodiments of the present invention.

FIG. 11C is a flow diagram illustrating an exemplary method of forward synchronization at the server. The server receives a start synchronization request from the client with a client ID in block 1131. Then, the server sends a start synchronization response to the client including the latest SHO ID in the global history table on the server, in block 1132. At initiation of main synchronization and in block 1133, the server receives a main synchronization request from the client with a SHO ID to establish a starting point for forward synchronization, and a maximum of "x" operations to send from the server. In block 1134, the server sends a main synchronization response to the client including a maximum of "x" unsynchronized operations since last synchronization, an indication of any remaining unsynchronized items, and if so, the next unsynchronized SHO ID on the global history table. In block 1135, the server waits and remains idle until the next main synchronization request from the client. In block 1136, if main synchronization request from the client meets a pre-defined condition, such as within a predefined duration, the server will receive a main synchronization request from the client, such as in block 1133; if not, the server will receive a start synchronization request from the client as in block 1131.

Figure 12A:
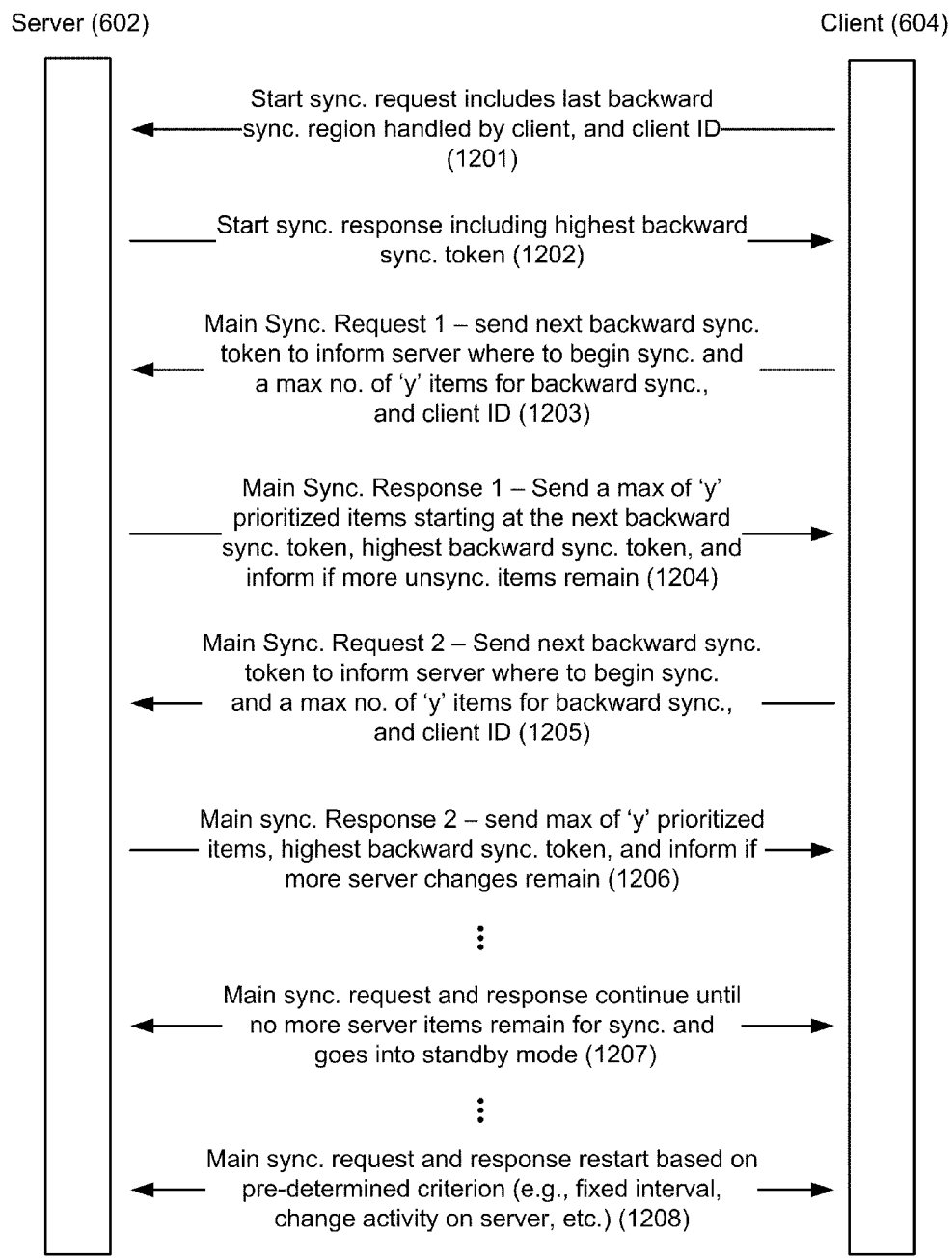
FIG. 12A is a diagram illustrating an exemplary interaction scheme between the server and the client during backward synchronization in accordance with some embodiments of the present invention.

FIG. 12A is a diagram illustrating an exemplary interaction scheme between the server and the client during backward synchronization. In some embodiments, as describe before, start synchronization initiates the server data synchronization process or resumes the server data synchronization after a client is disconnected from the server for a long period. A start synchronization request 1201 including a client ID and a last backward synchronized data range handled by the client that are sent from the client to the server. The server replies with a start synchronization response including highest backward synchronization token (BST) 1202. The client then sends to the server a main synchronization request 1 (1203) including the client ID, the highest BST received in the start synchronization response and a maximum number of "y" data items for synchronization. In response, the client receives a main synchronization response 1 (1204) from the server, including a maximum of "y" server data items, in order of high to low priority, an indication of any remaining unsynchronized data, and if present, the new next BST.

If the network connection between the server and the client remains active the main synchronization handshake repeats. In a main synchronization request 2 (1205), the client sends the next highest BST received from the main synchronization response 1 (1203) to identify next range of unsynchronized server data, the client ID, and a maximum number of "y" unsynchronized server data. The client then receives a main synchronization response 2 (1206) from the server including a maximum of "y" unsynchronized server data arranged in order of priority and an indication of any remaining unsynchronized data, and if present, the next highest unsynchronized BST. Main synchronization request and response continue until no more data remains for backward synchronization and client goes into standby mode 1207. The main synchronization process repeats when a pre-defined condition is satisfied, such as a fixed interval.

Figure 12B:
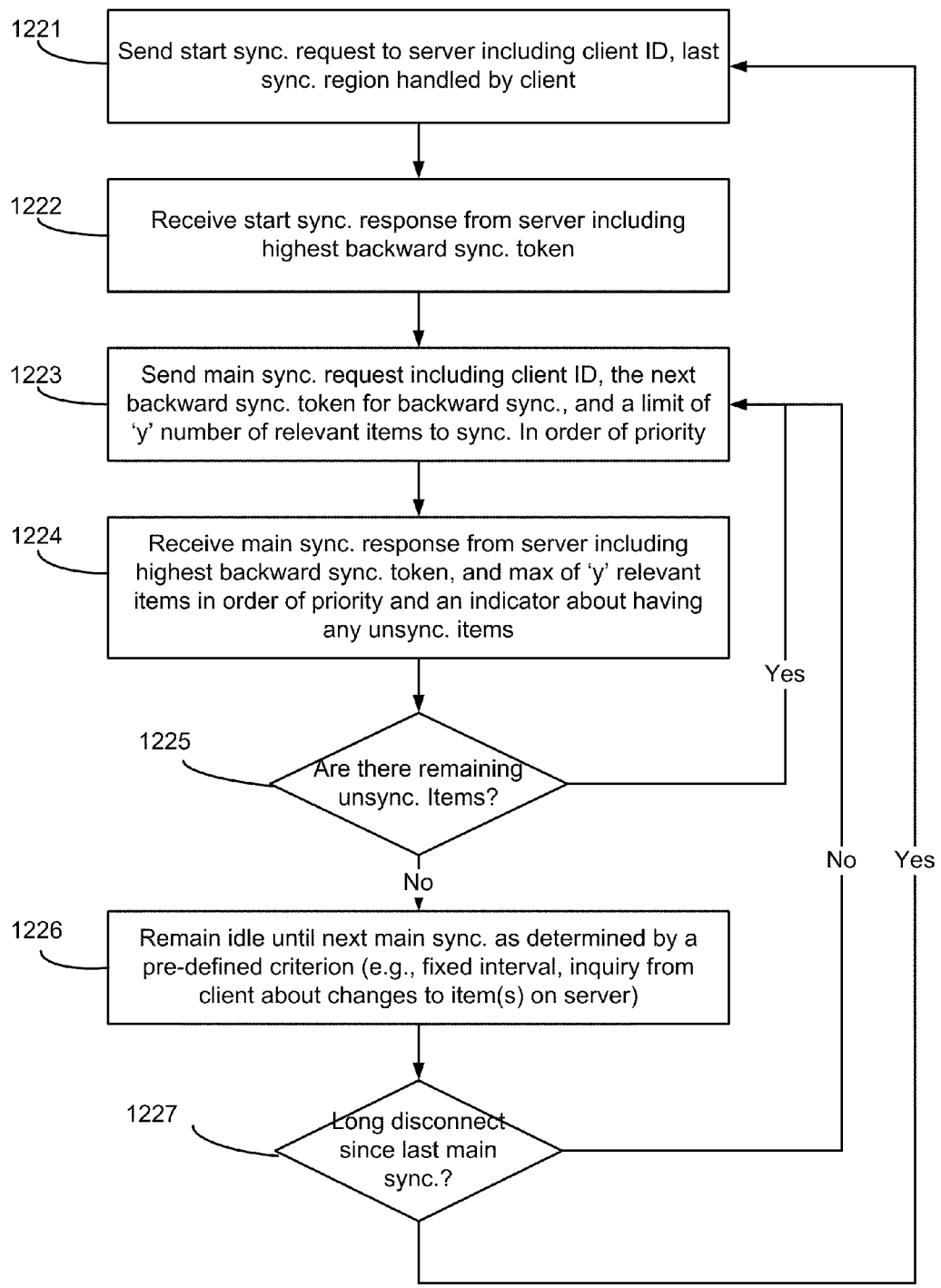
FIG. 12B is a flow diagram illustrating an exemplary method of backward synchronization at the client in accordance with some embodiments of the present invention.

FIG. 12B is a flow diagram illustrating an exemplary method of backward synchronization at the client. In block 1221, a client sends a start synchronization request to server including a client ID and last synchronized region handled by client having a first BST and a last BST convey the start and end of that unsynchronized region. The last synchronized region will be empty of this is the first start synchronization. In block 1222, a client receives a start synchronization response from the server including the highest BST corresponding to the highest priority unsynchronized server data. In block 1223, the client sends a main synchronization request including the client ID, the highest BST received in the start synchronization response, and a maximum number of "y" unsynchronized server data for backward synchronization. In block 1224, the client receives a main synchronization response from the server including a maximum number of "y" unsynchronized server data in order of priority, an indicator of any remaining unsynchronized data items, if present, the next highest unsynchronized BST. The client then determines if there are any remaining unsynchronized server data in block 1225. If there is, client will continue with main synchronization request as in block 1223. If there is not, the client remains idle until the next main synchronization occurs, as determined by a pre-defined condition 1226. In block 1227, the client determines if there is a long disconnect since the last main synchronization. If there is, the client will return to start synchronization to re-initiate data synchronization as in block 1221. If not, the client repeats main synchronization with the server as in block 1223.

Figure 12C:
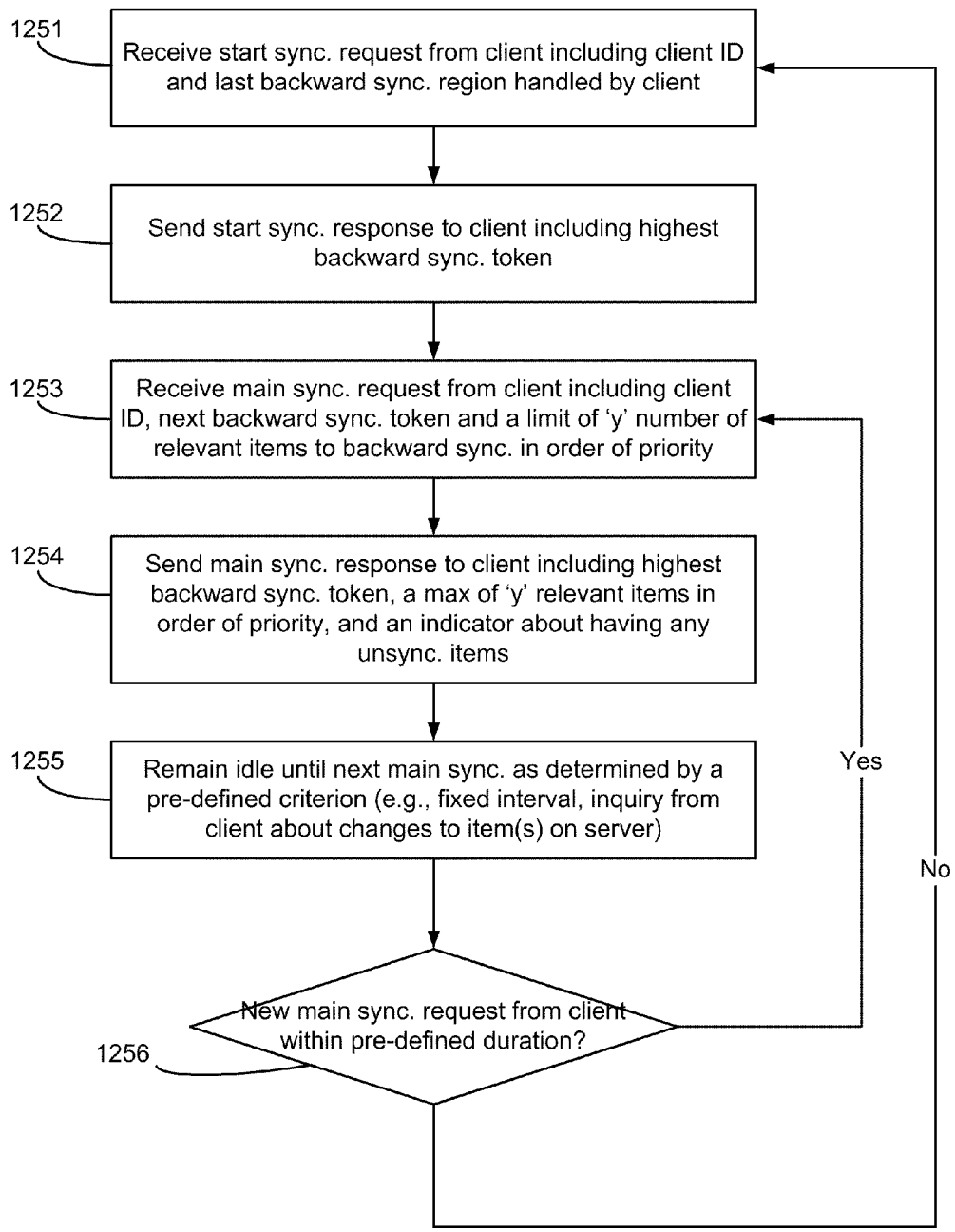
FIG. 12C is a flow diagram illustrating an exemplary method of backward synchronization at the server in accordance with some embodiments of the present invention.

FIG. 12C is a flow diagram illustrating an exemplary method of backward synchronization at the server. In block 1251, the server receives a start synchronization request from the client including the client ID, and the last synchronized data region handled by the client denoted by a first BST and a last BST in that data region. The synchronized data region will be empty if this is the first start synchronization request for the client. In block 1252, the start synchronization response is sent to the client including the highest BST on the server. In block 1253, the server receives a main synchronization request from the client that includes the client ID, the highest BST for establishing backward synchronization, and a maximum number of "y" items for backward synchronization from the server. In block 1254, the server sends a main synchronization response to the client including a maximum of "y" unsynchronized data items in order of priority, an indication of any remaining unsynchronized data, and if present, the BST of the next unsynchronized data. In block 1255, the server remains idle until the next main synchronization as determined by the pre-defined conditions. In block 1256, if there is a main synchronization request from the client within a pre-defined duration, the server will receive a main synchronization request from the client as in block 1253. If there is a long period of disconnect, the server will receive a start synchronization request from the client as in block 1251.

FIGS. 13A-D and 13X-Z are diagrams illustrating the concept of uphill synchronization between the client and the server. FIG. 13A shows a list of client data 1310A and a client history table 1310B. Each entry on the client history is a client history operation (CHO) representing operations performed to data on the client. In some embodiments, each CHO includes creation, modification or deletion operations as applied to data on the client, but does not include addition of new data from the server. In one embodiment, client data comprise a subset of all data on the server. Thus, the server maintains a complete record of all data and the client data includes a portion of that complete set of data. In other embodiments, the data set on the client is same as the set on the server.

When the client has either never synchronized with the server, is disconnected from the server for an extended period of time, or when the application using the data is terminated and then re-activated, a start synchronization handshake is used to initiate the entire synchronization process. If the client has never synchronized with the server, there will be no CHO to synchronize with the server, so no data change will be sent from the client to the server after initiation. If the client is disconnected from the server for an extended duration, data changes may have occurred on the client since a last synchronization. Or, if last synchronization was interrupted or if not all data changes were synchronized in last synchronization before the interruption, unsynchronized data changes may remain on the client.

FIG. 13A shows an example where there is a long disconnect between the client and the server where a series of data change operations CHO 25-29 have not been synchronized with the server. The dotted line represents the state of the data and client history table at initiation. The diagram shows that CHO 25 represents a data change in client item gg, CHO 26 represents a data change in client item kk, CHO 27 represents a data change in client item ii, CHO 28 represents a data change in item oo, and CHO 29 represents a data change in client item pp. For purposes of exemplary illustration, if each client item is a message in an email application, each data change may represent operations on a message including, but not limited to, adding a label, starring a message, deleting a message, composing a message etc. on the client.

FIG. 13X is a diagram illustrating the start synchronization handshake between the client and the server to initialize the synchronization process. The client sends a start synchronization request 1351 including a client ID to identify the client to the server. The server replies with a start synchronization response 1352 including the last CHO ID (e.g., CHO 24) last handled by the server (in the last data synchronization) to the client as starting point for the data synchronization. In some embodiments, data changes are arranged in chronological order, like forward synchronization as illustrated earlier. New items on top of the client history table have a higher CHO ID (e.g., CHO 29) while old items are at the bottom with a lower CHO ID (e.g., 26). The CHO ID, in one embodiment, is associated with the time in which the data operation occurred.

FIG. 13Y is a diagram illustrating the main synchronization handshake between the client and the server in the process of data synchronization. With the CHO ID provided by the server in the start synchronization response 1352, the client sends a main synchronization request 1353 including server data changes corresponding to items gg, ii, kk, oo represented by CHO 25-28. In some embodiments, the data changes are separated from the data. This means data changes are sent as change operations to the data rather than the entire data. For example, if a star is added to a message, or if a phone number has changed for a contact, or if two new labels are added to a message, the operations of adding the star, changing the new phone number for that contact, and addition of the two labels, are sent independent of the data. In other embodiments, the data (e.g., items gg, ii, kk, oo) including the modifications may be sent to the server to replace the corresponding unmodified items on the server. If all the CHO sent in the client's request are synchronized, the server sends a main synchronization response 1354 including the next CHO (e.g., CHO 28) as suggested by the client, back to the client in the next main synchronization response as a starting point for the next synchronization. If all the CHOs from the client are synchronized with the server, the server can either return the last synchronized CHO to the client in the main synchronization response, or not return a CHO ID at all.

FIG. 13B shows a diagram of the list of client data and the client history table after the first main synchronization. Shaded items (e.g., items gg, ii, kk, oo) on the client represent affected data with changes that have been synchronized with the server. In the local history table, CHO 29 remains unsynchronized. In some embodiments, CHOs which are successfully synchronized may be deleted and removed to conserve memory space. In other embodiments, the synchronized CHO may be kept for a short period of time and then removed after a certain duration or as memory is needed.

FIG. 13Z shows a second main synchronization handshake between the client and the server. Under normal operation where connection between the client and the server is active and there is no long disconnect, in some embodiments, upon termination of a previous main synchronization, a new main synchronization immediately occurs if there are unsynchronized data changes remaining on the client. The main synchronization handshake repeats until no more unsynchronized items remain on the client. In this example, the client sends a main synchronization request 1355 to the server including CHO 29-32, representing changes to items pp, dd, qq, and mm, according to the next highest CHO ID (e.g. CHO 29) sent by main synchronization response 1354, and the next highest unsynchronized CHO (e.g. None remaining) on the client history table as shown in FIG. 13C. Similar to forward synchronization and backward synchronization, a maximum number may be used to limit the number of data changes in the data synchronizations to minimize synchronization times. This main synchronization continues until all the CHO on the client have been synchronized with the server. For example, there are no more data changes after CHO 32, therefore, no next highest CHO will be sent in main synchronization response 1356 from the client to the server. FIG. 13D shows that items pp, dd, qq, and mm corresponding to data changes CHO 29-32 are shaded, showing that these changes are synchronized with the server. No unsynchronized CHO remains in the client history table as the synchronized CHOs are deleted.

One should appreciate that in some embodiments data synchronization may be initiated by a server instead of by a client. For instance, the server can at an interval communicate with the client to determine if more data changes occurred on the client. In both downhill and uphill synchronization, which device is used for data synchronization is unimportant. Instead, the communication and information being transmitted from one device to the other are crucial for determining a starting point and for differentiating which data changes have or have not been synchronized.

Figure 14A:
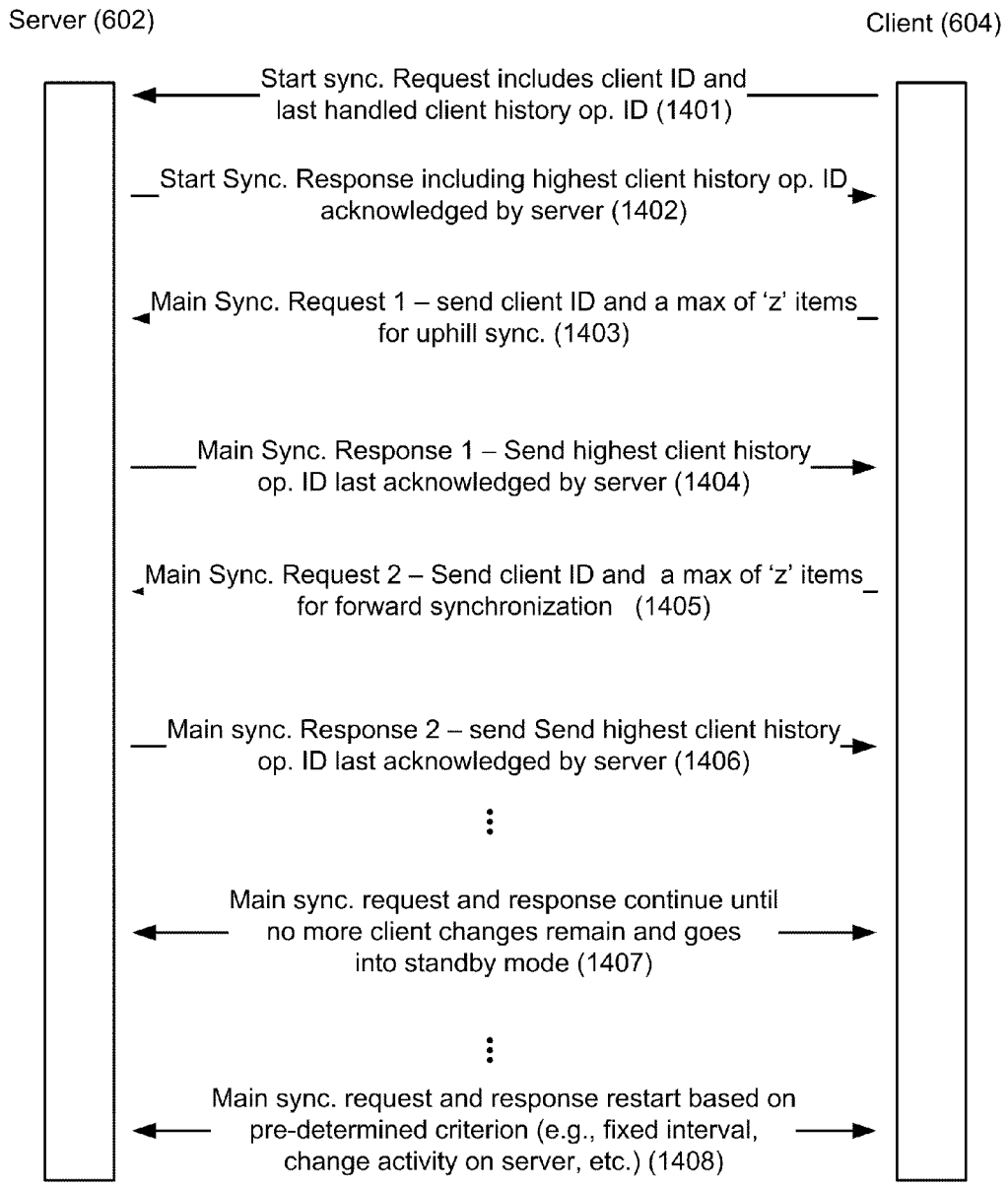
FIG. 14A is a diagram illustrating an exemplary interaction scheme between the server and the client during uphill synchronization in accordance with some embodiments of the present invention.

FIG. 14A is a diagram illustrating an exemplary interaction scheme between the server and the client during uphill synchronization. In one embodiment, the client sends a start synchronization request 1401 to the server a client ID and a CHO ID last handled by the client. The server replies with a start synchronization response 1402 including the highest CHO ID which it has handled, acknowledged, or synchronized. Knowing where data synchronization should begin based on the information in the start synchronization response 1402, the client sends a main synchronization request 1 (1403) including the client ID and a maximum number of "z" unsynchronized CHO to the server. The server replies with a main response 1 (1404) including the highest CHO ID acknowledged or handled by the server in arrow 1404. Assuming the synchronization is not interrupted, the next highest CHO ID would be same as the highest unsynchronized CHO ID that the server received from the client in main synchronization request 1 (1403). However, if an interruption occurred, the server may send the last CHO ID handled by the client so the server can determine where the next synchronization should begin.

In main synchronization 2, synchronization of remaining unsynchronized data on the client continue with the client sending a main synchronization request 2 (1405) that includes the client ID and a limit of maximum number of "z" data changes. The server replies with a main synchronization response 2 (1406) including the next highest CHO ID as suggested by the main synchronization request 2 (1405) or the highest CHO handled/synchronized by the server. Main synchronization handshake repeats until there all data changes on the client are synchronized with the server and both the client and the server switch into standby mode as in arrow 1407. Assuming no long periods of disconnect between the client and the server, the main synchronization handshake for synchronization client data changes initiates again according to a predefined condition or criteria as in arrow 1408. Start synchronization does not restart unless there is a long disconnect or if the application terminates.

Figure 14B:
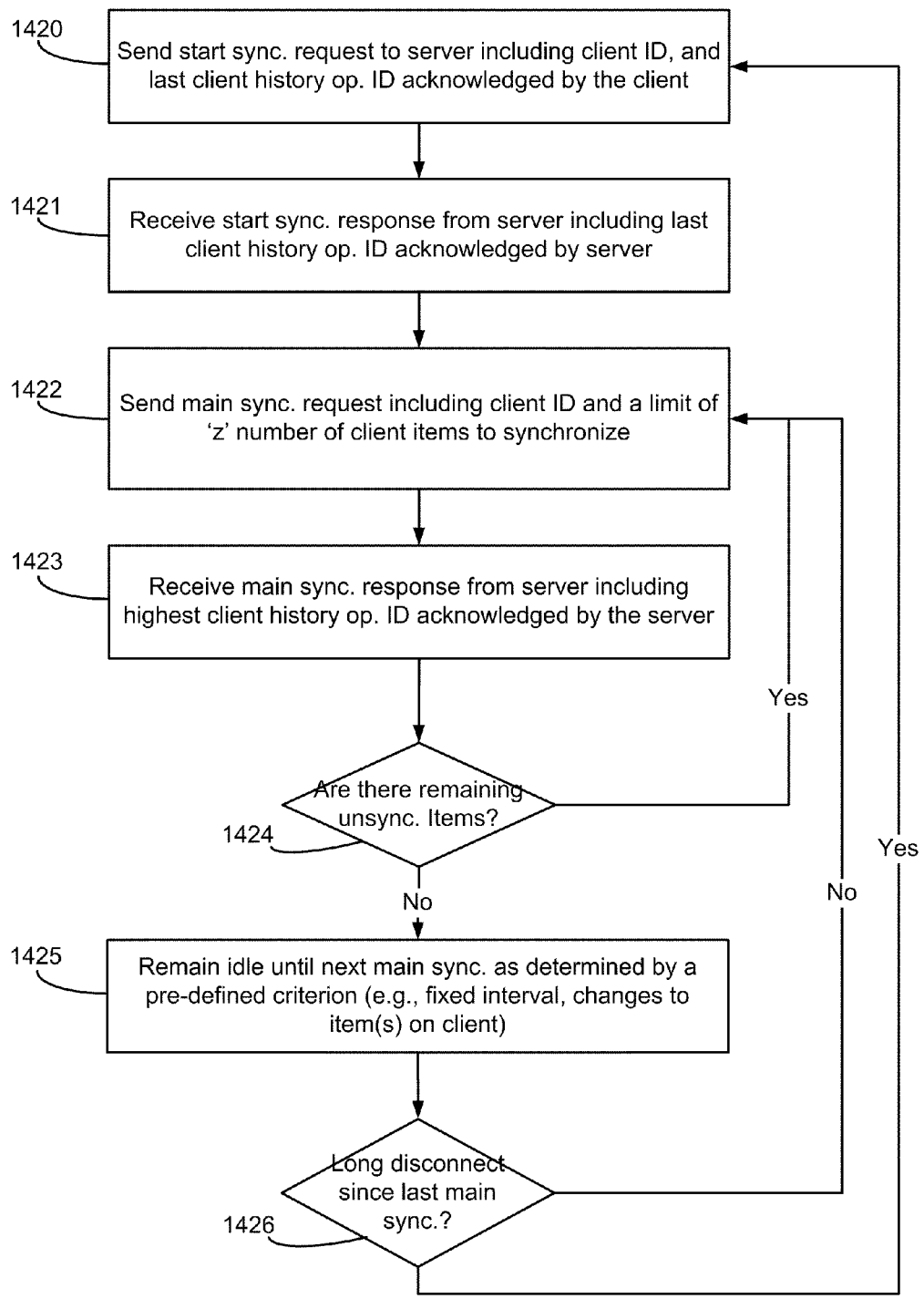
FIG. 14B is a flow diagram illustrating an exemplary method of uphill synchronization at the client in accordance with some embodiments of the present invention.

FIG. 14B is a flow diagram illustrating an exemplary method of uphill synchronization at the client. At initiation or after a long period of disconnect, the client sends a start synchronization request to the server with a client ID and the last CHO ID acknowledged by the client in block 1420. In block 1421, the client then receives a start synchronization response from the server including the last CHO ID handled by the server to inform the client where synchronization last ended for the server. In block 1422, during main synchronization or the process of data synchronization, the client sends a main synchronization request including client ID and a maximum of "z" unsynchronized data changes. In block 1423, the client will receive a main synchronization response from the server including either the next highest CHO ID as sent by the client earlier, or a last CHO ID acknowledged by the server. In block 1424, the client then determines if there are any remaining unsynchronized data changes. If there are remaining changes, the client continues to send these unsynchronized data changes to the client as shown in block 1422. If there are no more changes, the client will remain idle either until occurrence of the next main synchronization according to a predefined criterion, as shown in block 1425. If there is a long disconnect, then the client reinitiates the entire process with a start synchronization handshake as shown in block 1420, otherwise, the client resumes main synchronization as shown in block 1422.

Figure 14C:
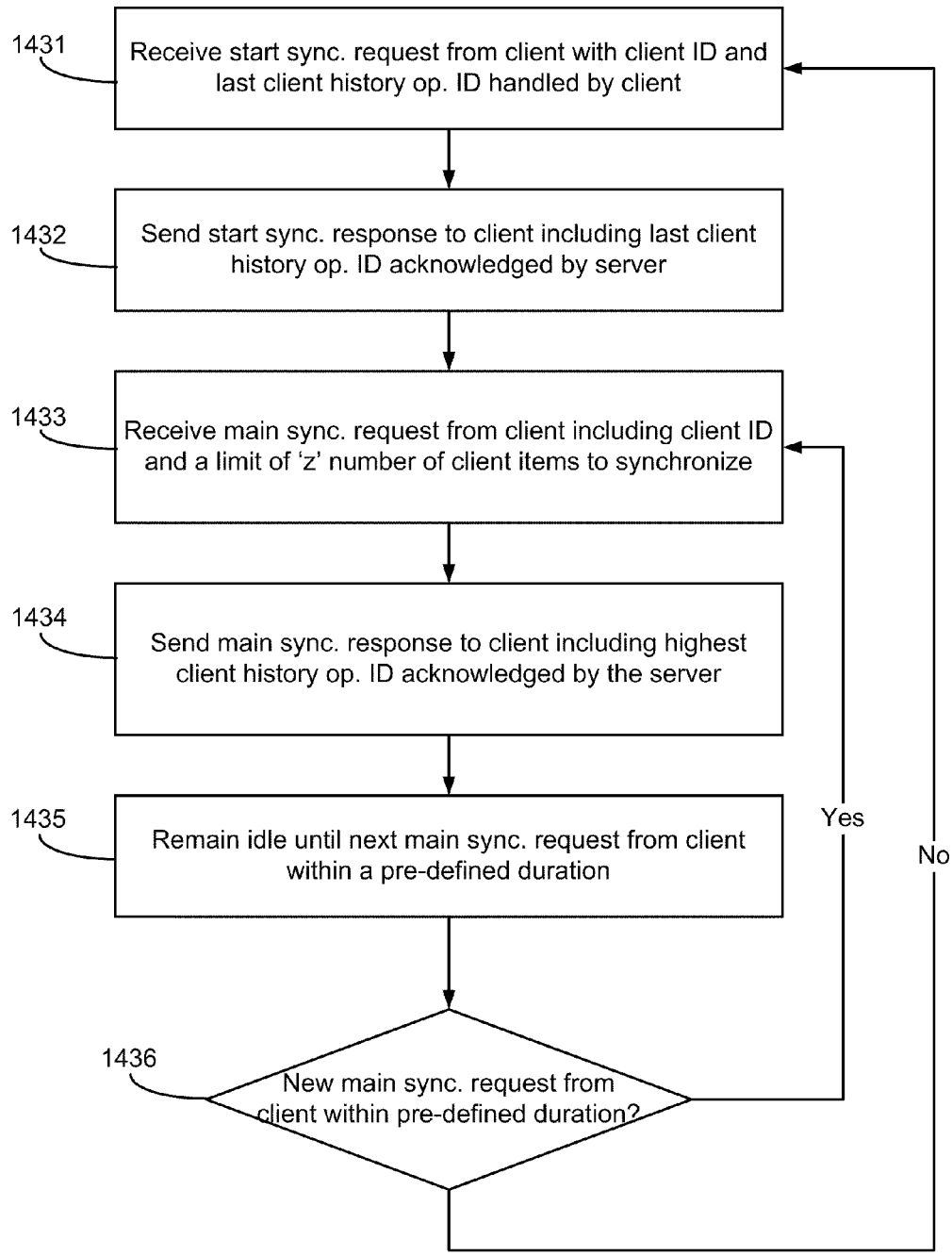
FIG. 14C is a flow diagram illustrating an exemplary method of uphill synchronization at the server in accordance with some embodiments of the present invention.

FIG. 14C is a flow diagram illustrating an exemplary method of uphill synchronization at the server. At initiation or after a long period of disconnect, the server receives a start synchronization request from the client with a client ID and the last CHO ID handled by the client in block 1431. The server then sends a start synchronization response to the client including the last CHO ID acknowledged or synchronized on the server to the client as shown in block 1432 to help the client determine where to begin with the next unsynchronized data range. In block 1433, the server receives a main synchronization request from the client with a client ID and a maximum allowable number of "z" data changes. In block 1434, if all data changes are successfully synchronized, the server will send a main synchronization response to the client including the next highest unsynchronized CHO ID as suggested by the client as shown in block 1433; if the data synchronization was interrupted, the last CHO ID handled by the server will be sent instead. In block 1435, the server remains idle until the next main synchronization request from the client under the conditions predefined. If there a main synchronization request is received satisfying the predefined conditions, main synchronization resumes as in block 1433; if there is not, the server will receive a start synchronization request from the client as shown in block 1431 to reinitiate the data synchronization process.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method to synchronize information with a server, comprising:
   at a client having one or more processors and memory storing programs for execution by the one or more processors:
   sending a request from the client to the server to initiate data synchronization with the client, wherein the request includes information to inform the server about a next data range to be synchronized with the client;
   receiving a communication from a server to selectively synchronize information between the server and the client;
   receiving information from the server, the information including a first data set and a second data set, wherein:

the first and second data sets are defined by the server based on a record of past synchronizations maintained on the server;

the first data set, distinct from the second data set, consists of data items that have never been synchronized with the client and have been selected in accordance with a priority of the data items, and the second data set is distinct from the first data set and consists of change operations that have been selected in accordance with a chronological order of the change operations, wherein change operations are deltas for ongoing data changes to previously synchronized data items, the changes occurring since a prior synchronization operation of the record of past synchronizations;

storing at least a portion of the data items from the first data set in memory of the client in accordance with the priority of the data items; and performing at least a portion of the change operations from the second data set in the chronological order that the change operations occurred, wherein the data items in the first data set and the change operations in the second data set are processed independently;

thereby enabling a user of the client to have access, at the client, to the portion of the stored data items in the first set and the previously synchronized data on which the portion of the change operations from the second set have been performed.

2. The method of claim 1, wherein:

the priority of the data is based on a priority determination at the server, and higher priority data is received before lower priority data; and the chronological order of the change operations is based on when change operations occurred on the server, and old changes are received before new changes.

3. The method of claim 1, wherein the data and the change operations are synchronized simultaneously and synchronization of overlapping change operations corresponding to data, and vice versa, are not repeated.

4. The method of claim 1, wherein the first data set and the second data set are from a single data source.

5. A method to synchronize information with a client, comprising:

at a server having one or more processors and memory storing programs for execution by the one or more processors:

receiving a request from the client to initiate data synchronization with the server, wherein the request includes information to inform the server about a next data range to be synchronized with the client;

identifying, based on a record of past synchronizations maintained on the server, data items that have never been synchronized with the client and change operations that have not been synchronized with the client;

sending a communication to the client to selectively synchronize information between the server and the client;

sending information to the client, wherein the information includes a first data set consisting of data items that have never been synchronized with the client, the first data set being selected from the identified data items in accordance with a priority of the identified data items, and a second data set distinct from the first data set, selected from the identified change operations, in a chronological order that the change operations occurred, wherein change operations are deltas for ongoing data changes to previously synchronized data items, the changes occurring since a prior synchronization operation of the record of past synchronizations, and the data items in the first data set and the change operations in the second data set are processed independently; and updating the record to include portions of the data items and change operations in the communication that have been successfully synchronized with the client upon termination of synchronization.

6. The method of claim 5, wherein:

the priority of the data is based on a priority determination at the server, and higher priority data is transmitted before lower priority data; and the chronological order of the change operations is based on when the change operations occurred on the server, and old changes are transmitted before new changes.

7. The method of claim 5, wherein the data and the change operations are synchronized simultaneously and synchronization of overlapping change operations corresponding to data, and vice versa, are not repeated.

8. A non-transitory computer readable storage medium and one or more computer programs embedded therein, the computer programs comprising instructions, which when executed by a computer system cause the computer system to:

at a client:

send a request from the client to the server to initiate data synchronization with the client, wherein the request includes information to inform the server about a next data range to be synchronized with the client;

receive a communication from a server to selectively synchronize information between the server and the client;

receive information from the server, the information including a first data set and a second data set, wherein:

the first and second data sets are defined by the server based on a record of past synchronizations maintained on the server;

the first data set, distinct from the second data set, consists of data items that have never been synchronized with the client and have been selected in accordance with a priority of the data items, and the second data set, distinct from the first data set, consists of change operations that have been selected in a chronological order that the change operations occurred, wherein change operations are deltas for ongoing data changes to previously synchronized data items, the changes occurring since a prior synchronization operation of the record of past synchronizations; and store at least a portion of the data items from the first data set in memory of the client in accordance with the priority of the data items;

thereby enabling a user of the client to have access, at the client, to the portion of the stored data items in the first set and the previously synchronized data on which the portion of the change operations from the second set have been performed, wherein the data items in the first data set and the change operations in the second data set are processed independently.

9. The computer readable storage medium of claim 8, wherein:

the priority of the data is based on a priority determination at the server, and higher priority data is received before lower priority data; and the chronological order of the change operations is based on when change operations occurred on the server, and old changes are received before new changes.

10. The computer readable storage medium of claim 8, wherein the data and the change operations are synchronized simultaneously and synchronization of overlapping change operations corresponding to data, and vice versa, are not repeated.

11. A non-transitory computer readable storage medium and one or more computer programs embedded therein, the computer programs comprising instructions, which when executed by a computer system, cause the computer system to:
 at a server:
  receive a request from the client to initiate data synchronization with the server, wherein the request includes information to inform the server about a next data range to be synchronized with the client;
  identify, based on a record of past synchronizations maintained on the server, data items that have never been synchronized with the client and change operations that had not been synchronized in last synchronization;
  send a communication to the client to selectively synchronize information between the server and the client;
  send information to the client, wherein the information includes a first data set consisting of data items that have never been synchronized with the client, the first data set being selected from the identified data items in accordance with a priority of the identified data items, and a second data set distinct from the first data set, selected from the identified change operations, in a chronological order that the change operations occurred, wherein change operations are deltas for ongoing data changes to previously synchronized data items, the changes occurring since a prior synchronization operation of the record of past synchronizations, and the data items in the first data set and the change operations in the second data set are processed independently; and
  update the record to include portions of the data items and change operations in the communication that have been successfully synchronized with the client upon termination of synchronization.

12. The computer readable storage medium of claim 11, wherein the data and the change operations are synchronized simultaneously and synchronization of overlapping change operations corresponding to data, and vice versa, are not repeated.

13. A client system, comprising:
 one or more processors;
 memory coupled to the one or more processors; and
 one or more programs, stored in the memory, configured for execution by the one or more processors, the one or more programs comprising instructions to:
  send a request from the client to the server to initiate data synchronization with the client, wherein the request includes information to inform the server about a next data range to be synchronized with the client;
  receive a communication from a server to selectively synchronize information to the client;
  receive information from the server, wherein the information includes a first data set and a second data set, wherein:
   the first and second data sets are defined by the server based on a record of past synchronizations maintained on the server;
   the first data set, distinct from the second data set, consists of at least a portion of data items on the server that have never been synchronized with the client, and has been selected in accordance with a priority of the data items, wherein the first data set is arranged in an order of priority from high priority to low priority, and
   the second data set is distinct from the first data set and consists of at least a portion of change operations on the server that has been selected in a chronological order that the change operations occurred, wherein change operations are deltas for ongoing data changes to previously synchronized data items, the changes occurring since a prior synchronization operation of the record of past synchronizations, wherein the second data set is arranged in a chronological order from old to new;
  store at least a portion of the information that has been successfully synchronized; and
  thereby enable a user of the client to have access, at the client, to the portions of stored information on the client, wherein the data items in the first data set and the change operations in the second data set are processed independently.

14. The client system of claim 13, wherein the one or more programs further include instructions to maintain a record of portions of the first data set and the second data set most recently synchronized on the client, wherein the record is used to inform the server of starting points for a subsequent synchronization.

15. The client system of claim 13, wherein the first data set and the second data set are simultaneously synchronized by different and independent mechanisms.

16. The client system of claim 13, wherein the order of priority corresponds to recency and chronological order corresponds to when each change operation occurred.

17. The client system of claim 13, wherein a limit of data is set for each of the first data set and the second data set for reducing time for each synchronization.

18. A server system, comprising:
 one or more processors;
 memory coupled to the one or more processors; and
 one or more programs, stored in the memory, configured for execution by the one or more processors, the one or more programs comprising instructions to:
  receive a request from the client to initiate data synchronization with the server, wherein the request includes information to inform the server about a next data range to be synchronized with the client;
  identify information on the server to be selectively synchronized with a client;
  send a communication to the client to selectively synchronize the information with the client;
  send information to the client, wherein the information includes:
   a first data set consisting of at least a portion of data items on the server that have never been synchronized with the client, and have been selected in accordance with a priority of the data items, wherein the first data set is arranged in an order of priority from high priority to low priority, and
   a second data set, distinct from the first data set, consisting of at least a portion of change operations on the server have been selected in a chronological order that the change operations occurred, wherein change operations are deltas for ongoing data changes to previously synchronized data items, the changes occurring since a prior synchronization operation of a record of past synchronizations, wherein the second data set is arranged in a chronological order from old to new, wherein the data items in the first data set and the change operations in the second data set are processed independently; and update a synchronization record on the server with the portions of information successfully synchronized with the client upon termination of synchronization.

19. The server system of claim 18, wherein the synchronization record includes historic information about data and change operations that have been successfully synchronized with the client in previous synchronizations.

20. The server system of claim 18, wherein the one or more programs further include instructions to identify overlapping data selected for the first data set and change operations selected for the second data set that are overlapping such that overlapped data and data operations are not repeatedly synchronized.

21. The server system of claim 18, wherein the first data set and the second data set are simultaneously synchronized by different and independent mechanisms.

22. The server system of claim 18, wherein the one or more programs further include instructions to receive data changes on the client that have not been synchronized with the server in an independent synchronization mechanism to simultaneously synchronize the data changes with the first data set and the second data set.

23. The server system of claim 18, wherein the one or more programs further include instructions to simultaneously send with the first data set and the second data set next starting points to the client for unsynchronized data and change operations remaining on the server.

24. A method to synchronize information with a server, comprising:
at a client device having one or more processors and memory storing programs for execution by the one or more processors:
sending a request to the server, wherein the request includes information related to a next range of data and change operations and instructions to begin a next synchronization;
in response to the request, receiving a communication from the server to selectively synchronize information from the server to the client;
receiving information from the server, wherein the information includes a first data set and a second data set, wherein:
the first and second data sets are defined by the server based on a record of past synchronizations maintained on the client:
the first data set, distinct from the second data set, consists of data items on the server that have never been synchronized with the client, and have been selected in accordance with a priority of the data items, wherein the first data set is received in an order of priority from high priority to low priority; and
the second data set, distinct from the first data set, consists of change operations have been selected in chronological order that the change operations occurred, wherein change operations are deltas for ongoing data changes to previously synchronized data items, the changes occurring since a prior synchronization operation of the record of past synchronizations, wherein the second data set is arranged in a chronological order based on occurrence of each change operation on the server, with old change operations to be received before new change operations;
storing at least a portion of the information in memory of the client; and
thereby enabling a user of the client device to, at the client device, access and use at least the portion of the information that has been successfully stored in memory, wherein the data items in the first data set and the change operations in the second data set are processed independently.

25. The method of claim 24 wherein the order of priority corresponds to a range of user relevance of the data such that more relevant data corresponds to high priority and less relevant data corresponds to low priority.

26. The method of claim 24, further comprising maintaining a record on the client of a last data range successfully synchronized with the server and wherein the request includes the last data range.

27. The method of claim 24, wherein the first data is synchronized by a first data synchronization mechanism and the second data is synchronized by a second data synchronization mechanism, wherein the first data synchronization mechanism and the second data synchronization mechanism are independent of each other but operate concurrently such that the first data set and the second data set are synchronized simultaneously.

28. The method of claim 27, wherein a maximum limit of data is pre-defined for each of the first data set and the second data set to reduce an operation time for each of the first and second data synchronization mechanisms.

29. The method of claim 24, further comprising sending a third data set to the server, wherein the sending of the third data set occurs simultaneously with the receiving of the information, wherein the third data set includes data changes on the client not previously synchronized with the server.

30. A method to synchronize information with a client device, comprising:
at a server having one or more processors and memory storing programs for execution by the one or more processors:
receiving a request from the client, wherein the request includes information related to determining a next range of data and change operations to be synchronized and instructions to begin next synchronization;
in response to the request, identifying unsynchronized data items and unsynchronized change operations for synchronization with the client;
sending a first communication to the client to selectively synchronize information on the server to the client;
sending information to the client, wherein the information includes a first data set and a second data set, wherein:
the first and second data sets are defined by the server based on a record of past synchronizations maintained on the client;
the first data set, distinct from the second data set, consists of data items on the server that have never been previously synchronized with the client, and have been selected in accordance with a priority of the data items, wherein the first data set is sent in an order of priority from high priority to low priority, and the second data set, distinct from the first data set, consists of change operations that have been selected in chronological order that the change operations occurred, wherein change operations are deltas for ongoing data changes to previously synchronized data items, the changes occurring since a prior synchronization operation of the record of past synchronizations, wherein the second data set is sent in a chronological order based on occurrence of each change operation on the server, with old change operations to be received before new change operations, wherein the data items in the first data set and the change operations in the second data set are processed independently;

updating a record in memory on the server, wherein the record includes at least a portion of the information that have been successfully synchronized with the client upon termination of synchronization.

31. The method of claim 30, wherein the order of priority corresponds to a range of user relevance of the data such that more relevant data corresponds to high priority and less relevant data corresponds to low priority.

32. The method of claim 30, wherein the first data is synchronized by a first data synchronization mechanism and the second data is synchronized by a second data synchronization mechanism, wherein the first data synchronization mechanism and second data synchronization mechanism are independent of each other but operate concurrently such that the first data set and the second data set are synchronized simultaneously.

33. The method of claim 32, wherein a maximum limit of data is pre-defined for each of the first data set and the second data set to reduce an operation time for each of the first and second data synchronization mechanisms.

34. The method of claim 30, further comprising receiving a third set of data from the client, wherein the receiving of the third set of data occurs simultaneously with the sending of the information, and wherein the third set of data includes data changes on the client not previously synchronized with the server.

35. The method of claim 30, further comprising sending a second communication to the client, wherein the second communication is sent simultaneously with the first communication, and wherein the second communication includes one or more next starting points for unsynchronized data and change operations remaining on the server.

* * * * *